United States Patent
Todoroki et al.

(10) Patent No.: US 10,227,453 B2
(45) Date of Patent: Mar. 12, 2019

(54) SILICONE RUBBER COMPOSITION AND CURED PRODUCT THEREOF

(71) Applicant: Shin-Etsu Chemical Co., Ltd., Tokyo (JP)

(72) Inventors: Daichi Todoroki, Annaka (JP); Tomoya Minamikawa, Annaka (JP); Ryosuke Yoshii, Annaka (JP); Kohei Masuda, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 15/371,643

(22) Filed: Dec. 7, 2016

(65) Prior Publication Data

US 2017/0158821 A1    Jun. 8, 2017

(30) Foreign Application Priority Data

Dec. 8, 2015   (JP) .................................. 2015-239253

(51) Int. Cl.
| | | |
|---|---|---|
| *C08G 77/04* | (2006.01) | |
| *C08K 9/08* | (2006.01) | |
| *C08K 3/20* | (2006.01) | |
| *C08K 3/36* | (2006.01) | |
| *C08L 83/04* | (2006.01) | |
| *C08K 3/22* | (2006.01) | |
| *C08K 5/00* | (2006.01) | |
| *C08K 5/14* | (2006.01) | |
| *C08G 77/20* | (2006.01) | |

(52) U.S. Cl.
CPC ................ *C08G 77/04* (2013.01); *C08K 3/20* (2013.01); *C08K 3/22* (2013.01); *C08K 3/36* (2013.01); *C08K 5/0025* (2013.01); *C08K 9/08* (2013.01); *C08L 83/04* (2013.01); *C08G 77/20* (2013.01); *C08K 5/14* (2013.01); *C08K 2003/2213* (2013.01); *C08K 2003/2231* (2013.01); *C08K 2003/2237* (2013.01); *C08K 2201/006* (2013.01)

(58) Field of Classification Search
CPC .................................. C08G 77/20; C08K 9/08
See application file for complete search history.

(56) References Cited

U.S. PATENT DOCUMENTS

| | | | |
|---|---|---|---|
| 3,352,781 A | 11/1967 | Buehler | |
| 4,929,391 A | 5/1990 | Kroupa | |
| 4,956,203 A | 9/1990 | Kroupa | |
| 6,288,152 B1 | 9/2001 | Okabe et al. | |
| 6,566,443 B2 | 5/2003 | Morimoto et al. | |
| 2010/0280163 A1* | 11/2010 | Hasegawa ................ | C08K 5/14 524/430 |
| 2014/0023855 A1 | 1/2014 | Masuda et al. | |

FOREIGN PATENT DOCUMENTS

| | | |
|---|---|---|
| EP | 2 554 585 A1 | 2/2013 |
| JP | 36-6189 | 5/1961 |
| JP | 2-80461 A | 3/1990 |
| JP | 7-150047 A | 6/1995 |
| JP | H10-279308 A | 10/1998 |
| JP | 2002-179917 A | 6/2002 |
| JP | 2003-327430 A | 11/2003 |
| JP | 2003-327431 A | 11/2003 |
| JP | 2009-215521 A | 9/2009 |
| JP | 4494543 B2 | 6/2010 |
| JP | 4730886 B2 | 7/2011 |
| JP | 4823431 B2 | 11/2011 |
| JP | 2012-199345 A | 10/2012 |
| JP | 2015-40223 A | 3/2015 |
| JP | 5704133 B2 | 4/2015 |
| WO | WO 2008/082001 A1 | 7/2008 |
| WO | WO 2014/105965 A1 | 7/2014 |

OTHER PUBLICATIONS

Extended European Search Report dated Apr. 13, 2017, in European Patent Application No. 16202536.5.

* cited by examiner

*Primary Examiner* — Kuo Liang Peng

(74) *Attorney, Agent, or Firm* — Birch, Stewart, Kolasch & Birch, LLP

(57) ABSTRACT

A silicone rubber composition is provided comprising (A) an alkenyl-containing organopolysiloxane, (B) reinforcing silica, (C) an inorganic particle-polysiloxane composite comprising inorganic nanoparticles having a polysiloxane containing $SiR^2R^3O_{2/2}$ and $SiR^4R^5R^6O_{1/2}$ units grafted to their surface, and (D) a curing agent. The composition cures into a transparent silicone rubber having UV-absorbing ability and heat resistance.

25 Claims, No Drawings

SILICONE RUBBER COMPOSITION AND CURED PRODUCT THEREOF

CROSS-REFERENCE TO RELATED APPLICATION

This non-provisional application claims priority under 35 U.S.C. § 119(a) on Patent Application No. 2015-239253 filed in Japan on Dec. 8, 2015, the entire contents of which are hereby incorporated by reference.

TECHNICAL FIELD

This invention relates to a silicone rubber composition loaded with an inorganic particle-polysiloxane composite (or polysiloxane-grafted inorganic particles) so that it may cure into a cured product (or silicone rubber) having improved transparency, UV-absorbing ability and heat resistance, a cured product of the silicone rubber composition, and a method for preparing the cured product.

BACKGROUND ART

By virtue of excellent properties including weather resistance, electric properties, low compression set, heat resistance and freeze resistance, silicone rubber find wide-spread use in a variety of fields such as electric appliances, automobiles, buildings, medical tools and food. Suitable parts made of silicone rubber include, for example, key pads used as rubber contacts in remote controllers, type writers, word processors, computer terminals, and musical instruments; gaskets in buildings; dampers in audio equipment; automobile parts such as connector seals and spark plug boots; packings in compact disk drives; and bread or cake molds. Since the demand for silicone rubber is increasing in recent years, there is a desire to develop a silicone rubber having better properties.

Patent Documents 1 and 2 describe room temperature-curable silicone rubber compositions having UV absorbers added thereto, for use as building sealant. The compositions are of condensation cure type. A photostabilizer and UV absorber are added to impart durable adhesion. No reference is made to transparency.

Patent Document 3 describes a UV-absorbing silicone coating composition. Since this composition is a coating agent, it must be coated onto a molded article to form a coating having UV-absorbing properties. Since a benzotriazole-containing silane is used as the UV absorber, its weather resistance is poor. Patent Document 4 describes a coating agent comprising a UV absorptive group-containing organopolysiloxane. This coating agent must be coated onto a substrate. Its weather resistance is poor. Patent Document 5 describes a room temperature curable coating agent comprising a triazine base UV absorber.

It is well known that liquid dispersions containing titanium oxide particles are effective as the additive for imparting UV-shielding ability. They are used in a variety of fields including coating compositions, cosmetics and hard coat agents. Patent Documents 6 and 7 describe rutile type titanium dioxide particles, which are added to coating compositions. If such particles are added to heat curable silicone rubber compositions, transparency is lost.

A number of methods for improving the heat resistance of silicone rubber are known in the art, for example, a method of blending an inorganic filler to control oxidative degradation and improve heat resistance. For example, Patent Document 8 proposes addition of iron oxide, Patent Document 9 proposes addition of rare earth oxides and hydroxides, and Patent Document 10 proposes addition of surface-treated carbon black. These inorganic fillers, however, have the problem that they detract from transparency.

Metal oxide particles tend to agglomerate together as the average particle size becomes smaller, and when added to heat curable silicone rubber base compounds, adversely affect transparency. Also, when a sol of metal oxide particles dispersed in an organic solvent, alcohol or water is added to heat curable silicone rubber base compounds, the metal oxide particles agglomerate together to detract from transparency.

Patent Document 11 discloses that cerium oxide dispersed in an organosiloxane oil having a phenyl content of 5 to 73% by weight is blended in a silicone rubber base compound at the sacrifice of transparency.

Patent Document 12 proposes to add a cerium oxide powder prepared by the sol-gel method to a heat curable silicone rubber composition for improving its heat resistance. It is described that the cured silicone rubber loaded with 0.05 wt % of cerium oxide powder is transparent. On evaluation of heat resistance, however, 1.5 wt % of cerium oxide powder is added to a silicone rubber composition, which is not transparent in the cured state. Since cerium oxide particles with a smaller particle size agglomerate together with a lapse of time, they detract from transparency when added to a heat curable silicone rubber composition.

CITATION LIST

Patent Document 1: JP 4823431
Patent Document 2: JP 4494543
Patent Document 3: JP-A 2015-040223
Patent Document 4: JP 4730886
Patent Document 5: JP-A 2009-215521
Patent Document 6: JP-A 2003-327430
Patent Document 7: JP-A 2003-327431
Patent Document 8: U.S. Pat. No. 3,352,781
Patent Document 9: JP-B S36-6189
Patent Document 10: JP-A H02-80461
Patent Document 11: JP-A 2002-179917
Patent Document 12: WO 2008/082001

DISCLOSURE OF INVENTION

An object of the invention is to provide a silicone rubber composition loaded with an inorganic particle-polysiloxane composite (or polysiloxane-grafted inorganic particles), which cures into a product (silicone rubber) having improved transparency, UV-absorbing ability and heat resistance, a cured product of the silicone rubber composition, and a method for preparing the cured product.

In one aspect, the invention provides a silicone rubber composition comprising:

(A) 100 parts by weight of an organopolysiloxane containing at least two alkenyl groups per molecule and having the average compositional formula (1):

$$R_nSiO_{(4-n)/2} \tag{1}$$

wherein R is each independently a substituted or unsubstituted, monovalent hydrocarbon group and n is a positive number of 1.95 to 2.05, (B) 5 to 100 parts by weight of reinforcing silica having a specific surface area of at least 50 m²/g, (C) 0.001 to 10 parts by weight of an inorganic particle-polysiloxane composite, and (D) an effective amount of a curing agent, the inorganic particle-polysiloxane composite (C) comprising inorganic particles and a polysiloxane containing $SiR^2R^3O_{2/2}$ and $SiR^4R^5R^6O_{1/2}$ units grafted at least in part to surfaces of the particles, the inorganic particles having a 50% cumulative particle size of 1 to 200 nm in volume basis particle size distribution as measured by the dynamic light scattering method, the polysiloxane being bonded to the inorganic particle surface optionally via a siloxane coating layer containing $SiR^1O_{3/2}$ units, and a total of siloxane constituents represented by $SiR^1O_{3/2}$, $SiR^2R^3O_{2/2}$, and $SiR^4R^5R^6O_{1/2}$ units being 20 to 20,000 parts by weight per 100 parts by weight of the inorganic particles. Herein $R^1$ is independently hydrogen or a group selected from the group consisting of a $C_1$-$C_{20}$ alkyl group, $C_2$-$C_{20}$ alkenyl group, $C_6$-$C_{20}$ aryl group, and (poly)dimethylsiloxy group of up to 50 silicon atoms, which may be substituted with a (meth)acrylic, oxiranyl, amino, mercapto, isocyanate or fluorine radical, $R^2$, $R^3$, $R^4$ and $R^5$ are each independently hydrogen or a group selected from the group consisting of a $C_1$-$C_{20}$ alkyl group, $C_2$-$C_{20}$ alkenyl group, $C_6$-$C_{20}$ aryl group, and (poly)dimethylsiloxy group of up to 50 silicon atoms, which may be substituted with a (meth)acrylic, oxiranyl or fluorine radical, and $R^6$ is hydrogen or a group selected from the group consisting of a $C_1$-$C_{20}$ alkyl group, $C_2$-$C_{20}$ alkenyl group, $C_6$-$C_{20}$ aryl group, (poly)dimethylsiloxy group of up to 50 silicon atoms, $C_1$-$C_{10}$ alkoxy group, and hydroxyl group, which may be substituted with a (meth)acrylic, oxiranyl or fluorine radical, In a preferred embodiment, the inorganic particles in component (C) comprise at least one compound selected from the group consisting of aluminum oxide, cerium oxide, titanium oxide, zinc oxide, indium tin oxide, zirconium oxide, tin oxide, iron oxide, and silicon oxide.

In a preferred embodiment, the inorganic particles in component (C) are of core/shell structure having a core comprising at least one compound selected from the group consisting of aluminum oxide, cerium oxide, titanium oxide, zinc oxide, indium tin oxide, zirconium oxide, tin oxide, and iron oxide and a shell of silicon oxide around the core.

In a preferred embodiment, the curing agent (D) is an organic peroxide or a combination of an organohydrogenpolysiloxane with a hydrosilylation catalyst, the composition being of addition reaction cure type.

In another aspect, the invention provides a cured silicone rubber comprising the silicone rubber composition defined above in the cured state. Preferably the cured silicone rubber has a light transmittance at wavelength 700 nm of at least 70% at a thickness of 2 mm.

In a further aspect, the invention provides a method for preparing a cured silicone rubber, comprising the step of heat curing the silicone rubber composition defined above. Preferably, the heat curing step includes heat molding the silicone rubber composition at 80 to 400° C. The molding step is typically by extrusion molding, compression molding or injection molding.

Advantageous Effects of Invention

The silicone rubber composition cures into a silicone rubber having improved transparency, UV-absorbing ability and heat resistance.

DESCRIPTION OF PREFERRED EMBODIMENT

As used herein, the notation (Cn-Cm) means a group containing from n to m carbon atoms per group. Me stands for methyl. The abbreviation: NMR is nuclear magnetic resonance spectroscopy, GPC is gel permeation chromatography, DOP is degree of polymerization, and TGA is thermogravimetric analysis. The inorganic particle-polysiloxane composite is sometimes referred simply as "composite."

Except component (C), the silicone rubber composition of the invention is not particularly limited as long as it is heat curable. Preferred is a silicone rubber composition comprising (A) an organopolysiloxane having at least two alkenyl groups per molecule as a base polymer and (D) a curing agent which is (D-1) an addition reaction curing agent and/or (D-2) an organic peroxide curing agent. The composition may be either millable or liquid. The liquid silicone rubber composition is self-flowing at room temperature (typically 25° C.±10° C.) whereas the millable silicone rubber composition is a gum-like composition which has a high viscosity, is non-self-flowing and non-liquid (specifically, solid or highly viscous paste form) at room temperature, and may be uniformly milled under high shear stresses by a kneading means such as roll mill.

Component A

Component (A) is an organopolysiloxane having the average compositional formula (1):

$$R_nSiO_{(4-n)/2} \tag{1}$$

wherein R is each independently a substituted or unsubstituted, monovalent hydrocarbon group and n is a positive number of 1.95 to 2.05.

In formula (1), R is each independently a substituted or unsubstituted, monovalent hydrocarbon group, preferably of 1 to 12 carbon atoms, more preferably 1 to 8 carbon atoms. Examples of the substituted or unsubstituted, monovalent hydrocarbon group include alkyl groups such as methyl, ethyl, propyl, butyl, hexyl, and octyl; cycloalkyl groups such as cyclopentyl and cyclohexyl; alkenyl groups such as vinyl, allyl, and propenyl; cycloalkenyl groups; aryl groups such as phenyl and tolyl; aralkyl groups such as benzyl and 2-phenylethyl; and substituted forms of the foregoing in which some or all hydrogen atoms are substituted by halogen atoms (e.g., fluoro or chloro), cyano radicals or the like, such as chloromethyl, trifluoropropyl and cyanoethyl. Inter alia, methyl, vinyl, phenyl, and trifluoropropyl are preferred, with methyl and vinyl being most preferred.

The organopolysiloxane as component (A) should contain at least two, specifically 2 to 50, more specifically 2 to 20 aliphatic unsaturated groups, typically alkenyl or cycloalkenyl groups, especially vinyl groups. Preferably aliphatic unsaturated groups account for 0.01 to 20 mol %, especially 0.02 to 10 mol % of all R groups. The aliphatic unsaturated group may be bonded to the silicon atom at the end of the molecular chain or a silicon atom midway the molecular chain (or at a non-terminal position of the molecular chain), or both, preferably bonded to at least the silicon atom at the end of the molecular chain.

It is desired that at least 80 mol %, more desirably at least 90 mol %, even more desirably at least 95 mol % of all R groups, and most desirably all R groups exclusive of the aliphatic unsaturated groups be alkyl, especially methyl.

The subscript n is a positive number of 1.95 to 2.05, preferably 1.98 to 2.02 and more preferably 1.99 to 2.01.

With respect to the molecular structure, the organopolysiloxane as component (A) preferably has a linear structure or partially branched linear structure. Specifically, preferred are organopolysiloxanes whose backbone is composed of repeating diorganosiloxane ($R_2SiO_{2/2}$ wherein R is as defined above) units which are dimethylsiloxane units, and organopolysiloxanes whose backbone has a dimethylpolysiloxane structure consisting of repeating dimethylsiloxane units, in which a diphenylsiloxane unit, methylphenylsiloxane unit, methylvinylsiloxane unit, methyl-3,3,3-trifluoropropylsiloxane unit having phenyl, vinyl, 3,3,3-trifluoropropyl or the like is introduced in a portion of the structure.

Also, the organopolysiloxane is preferably blocked at both ends of the molecular chain with triorganosiloxy ($R_3SiO_{1/2}$) groups such as trimethylsiloxy, dimethylphenylsiloxy, vinyldimethylsiloxy, divinylmethylsiloxy, or trivinylsiloxy, or hydroxydiorganosiloxy ($R_2(HO)SiO_{1/2}$) groups such as hydroxydimethylsiloxy.

As alluded to above, the preferred organopolysiloxanes as component (A) are linear ones which are blocked at both ends of the molecular chain with triorganosiloxy ($R_3SiO_{1/2}$) groups or hydroxydiorganosiloxy ($R_2(HO)SiO_{1/2}$) groups and have a backbone composed of repeating diorganosiloxane ($R_2SiO_{2/2}$) units. The organopolysiloxanes which are preferred in terms of the substituent group (i.e., silicon-bonded, optionally substituted monovalent hydrocarbon group) include methylvinylpolysiloxane, methylphenylvinylpolysiloxane, methyltrifluoropropylvinylpolysiloxane and dimethylpolysiloxane.

These organopolysiloxanes may be obtained from (co) hydrolytic condensation of one or more organohalogenosilanes, or ring-opening polymerization of a cyclic polysiloxane (e.g., siloxane trimer or tetramer) in the presence of a basic or acidic catalyst.

The organopolysiloxane preferably has a degree of polymerization (DOP) of at least 100, typically 100 to 100,000, more preferably 150 to 100,000. It is noted that DOP may be measured as weight average DOP by GPC versus polystyrene standards.

While the organopolysiloxane may be used alone, a mixture of two, three or more organopolysiloxanes which are different in molecular weight (or DOP) or molecular structure is also acceptable as component (A).

Component B

Component (B) is reinforcing silica. It is a filler which is added to a silicone rubber composition to impart mechanical strength thereto. The silica should have a specific surface area of at least 50 m$^2$/g, preferably 100 to 450 m$^2$/g, and more preferably 100 to 300 m$^2$/g, as measured by the BET adsorption method. Silica with a surface area of less than 50 m$^2$/g results in a cured product with a low mechanical strength.

Examples of the reinforcing silica include fumed silica and precipitated silica (or wet silica). Silica may be surface treated with organosilane compounds (e.g., methylchlorosilane) or silazane compounds (e.g., hexamethyldisilazane) to be hydrophobic. Inter alia, fumed silica is preferred because of good dynamic fatigue.

Silica may be used alone or in admixture of two or more species.

The reinforcing silica as component (B) is used in an amount of 5 to 100 parts, preferably 10 to 100 parts, and more preferably 20 to 60 parts by weight per 100 parts by weight of the organopolysiloxane as component (A). Outside the range, a smaller amount of component (B) fails to exert a reinforcing effect whereas a larger amount adversely affects workability, mechanical strength and dynamic fatigue durability.

It is noted that a dispersant or wetter for the reinforcing silica (B) may be added to the composition if desired. The wetter used herein is selected from silane compounds having a silanol group (i.e., silicon-bonded hydroxyl group) such as diphenylsilane diol, silanol-containing organosiloxane oligomers such as linear dimethylsiloxane oligomers blocked at both ends of the molecular chain with silanol groups (e.g., low-polymerization polymers having a DOP or silicon count per molecule of about 2 to 30, especially about 3 to 20), and mixtures thereof.

The wetter may be used in an amount of 0 to 25 parts, preferably 3 to 20 parts by weight per 100 parts by weight of component (A).

Component C

Component (C) is an inorganic particle-polysiloxane composite comprising inorganic particles and a polysiloxane containing $SiR^2R^3O_{2/2}$ and $SiR^4R^5R^6O_{1/2}$ units grafted at least in part to surfaces of the particles. The inorganic particles have a 50% cumulative particle size of 1 to 200 nm in volume basis particle size distribution as measured by the dynamic light scattering method. The polysiloxane may be bonded to the inorganic particle surface via a siloxane coating layer containing $SiR^1O_{3/2}$ units. The total of siloxane constituents represented by $SiR^1O_{3/2}$, $SiR^2R^3O_{2/2}$, and $SiR^4R^5R^6O_{1/2}$ units is 20 to 20,000 parts by weight per 100 parts by weight of the inorganic particles.

Herein $R^1$ is independently hydrogen or a group selected from among a $C_1$-$C_{20}$ alkyl group, $C_2$-$C_{20}$ alkenyl group, $C_6$-$C_{20}$ aryl group, and (poly)dimethylsiloxy group of up to 50 silicon atoms, which may be substituted with a (meth) acrylic, oxiranyl, amino, mercapto, isocyanate or fluorine radical. $R^2$, $R^3$, $R^4$ and $R^5$ are each independently hydrogen or a group selected from among a $C_1$-$C_{20}$ alkyl group, $C_2$-$C_{20}$ alkenyl group, $C_6$-$C_{20}$ aryl group, and (poly)dimethylsiloxy group of up to 50 silicon atoms, which may be substituted with a (meth)acrylic, oxiranyl or fluorine radical. $R^6$ is hydrogen or a group selected from among a $C_1$-$C_{20}$ alkyl group, $C_2$-$C_{20}$ alkenyl group, $C_6$-$C_{20}$ aryl group, (poly) dimethylsiloxy group of up to 50 silicon atoms, $C_1$-$C_{20}$ alkoxy group, and hydroxyl group, which may be substituted with a (meth)acrylic, oxiranyl or fluorine radical.

The grafted polysiloxane consists essentially of $SiR^2R^3O_{2/2}$ and $SiR^4R^5R^6O_{2/2}$ units, but may optionally contain $SiO_2$ and $R^2SiO_{3/2}$ units. The siloxane coating layer consists essentially of $SiR^1O_{3/2}$ units, but may optionally contain D units and/or Q units.

Herein Q units refer to units of $SiO_{4/2}$ structure, T units refer to units of $SiR^1O_{3/2}$ structure, D units refer to units of $SiR^2R^3O_{2/2}$ structure, and M units refer to units of $SiR^4R^5R^6O_{1/2}$ structure, unless otherwise stated. Also, M units may have at least one oxygen atom substituted on the silicon as long as they are polysiloxane terminal constituents in the graft moiety, unless otherwise stated. For example, $R^6$ may be alkoxy or hydroxyl.

Polysiloxane Component

Of the groups $R^1$, $R^2$, $R^3$, $R^4$, $R^5$ and $R^6$, the $C_1$-$C_{20}$ alkyl groups are preferably those of 1 to 6 carbon atoms, and include methyl, ethyl, propyl, and butyl. Inter alia, methyl is most preferred. The $C_2$-$C_{20}$ alkenyl groups are preferably those of 2 to 6 carbon atoms, more preferably vinyl and allyl. The $C_1$-$C_{20}$ alkoxy groups are preferably those of 1 to 6 carbon atoms, and include methoxy, ethoxy, propoxy, and butoxy. Inter alia, methoxy is most preferred. The $C_6$-$C_{20}$ aryl groups are preferably those of 6 to 10 carbon atoms, and phenyl, tolyl, and xylyl are more preferred. The (poly) dimethylsiloxy groups of up to 50 silicon atoms are preferably those of 1 to 50 silicon atoms, more preferably 1 to 30 silicon atoms.

When $R^1$, $R^2$, $R^3$, $R^4$, $R^5$ and $R^6$ are methyl, an inorganic particle composite having storage stability and heat resistance may be obtained. When some of $R^1$, $R^2$, $R^3$, $R^4$, $R^5$ and $R^6$ are phenyl, an inorganic particle composite having high affinity to phenyl silicone materials may be obtained. When at least one of $R^1$, $R^2$, $R^3$, $R^4$, $R^5$ and $R^6$ is hydrogen, vinyl or allyl, there may be obtained the advantage that when a mixture of the inorganic particle composite and a silicone composition is cured, a tough material in which the inorganic particles are crosslinked to the silicone composition may be obtained because the relevant group undergoes hydrosilylation reaction with hydrogensilicone or vinylsilicone in the silicone composition. When $R^6$ is hydroxyl or alkoxy, the silicone chain may be extended or terminally modified by reaction with various cyclic siloxanes or alkoxysilanes.

The total of T units in the inorganic particle-polysiloxane composite is preferably 0 to 100 parts by weight, more preferably 10 to 70 parts by weight, and even more preferably 10 to 50 parts by weight per 100 parts by weight of the organic particles. If the total of T units exceeds 100 parts by weight, many T units are bonded to the particle surface to cap hydroxyl groups on the particle surface, which can prevent the graft moiety from efficiently bonding to the inorganic particles.

The total of D units in the inorganic particle-polysiloxane composite is preferably 10 to 10,000 parts by weight, more preferably 50 to 1,000 parts by weight, and even more preferably 100 to 500 parts by weight per 100 parts by weight of the organic particles. If the total of D units is less than 10 parts by weight, the polysiloxane coverage may be too low to avoid direct contact between inorganic particles, leading to poor dispersibility in non-polar solvents. If the total of D units exceeds 10,000 parts by weight, the weight proportion of the inorganic particles in the inorganic particle-polysiloxane composite is relatively low, with a possibility that the inorganic particles fail to exert their functionality.

Preferably, the inorganic particle-polysiloxane composite satisfies the relation: 0<(number of M units)<(number of D units). If the number of M units is more than or equal to the number of D units, which means the presence of more polymer chain terminating component, the grafted polysiloxane may have too low a molecular weight to avoid direct contact between inorganic particles, leading to poor dispersibility in non-polar solvents. A ratio of the number of M units to the number of D units is preferably up to 0.5/1, more preferably up to 0.2/1. The lower limit is preferably at least 0.001/1.

The inorganic particle-polysiloxane composite should contain the polysiloxane component in an amount of 20 to 20,000 parts by weight, preferably 50 to 10,000 parts by weight per 100 parts by weight of the inorganic particles. Less than 20 parts by weight of the polysiloxane component may fail to avoid direct contact between inorganic particles, leading to poor dispersibility in non-polar solvents. More than 20,000 parts by weight of the polysiloxane component means that the relative proportion of the inorganic particles in the composite is low, with a possibility that the inorganic particles fail to exert their functionality.

The amount of polysiloxane introduced may be computed by determining the weight of the residue after thermogravimetric analysis (TGA) as the weight of the inorganic particles and the weight loss as the weight of the polysiloxane component. For the TGA, an instrument Thermo Plus by Rigaku Corporation may be used. The analysis is preferably carried out in an inert atmosphere for preventing reaction with oxygen.

The graft moiety designates the polysiloxane component grafted to the surface of inorganic particles by surface treatment thereof. While silica particles contain $SiO_2$ units (Q units) or core/shell type particles contain Q unit silicon in the shell, these siloxane constituents in particles themselves are not encompassed in the graft moiety. On the other hand, where inorganic particles are surface treated with a polysiloxane capped with a trimethoxysiloxy group at one end, i.e., having a reactive Q unit at one end (e.g., X-24-9822 by Shin-Etsu Chemical Co., Ltd.), the Q unit from X-24-9822 bonded to the particle surface is encompassed in the graft moiety.

That is, the graft moiety refers to a linear polysiloxane moiety bonded to reactive groups such as OH and methoxy groups on the surface of particles.

Inorganic Particles

The inorganic particles contain a core-forming element which is preferably selected from among Group 13 elements, Group 14 elements (exclusive of carbon), first-row transition elements, second-row transition elements, third-row transition elements, and lanthanoids. Of Group 13 elements, oxides of aluminum, boron, and indium are more preferred. Of Group 14 elements (exclusive of carbon), metal silicon particles and oxides of silicon and tin are more preferred. Of the first-row transition elements, oxides of titanium, manganese, and zinc are more preferred. These oxides are often used as an agent for absorbing light of specific wavelength. Of the second-row transition elements, silver particles and oxides of yttrium and zirconium are more preferred. These oxides are often used as an agent for absorbing light of specific wavelength and a phosphor. Of the third-row transition elements, gold particles and oxides of hafnium and tantalum are more preferred. Of the lanthanoids, oxides of lanthanum, cerium, praseodymium, neodymium, terbium, dysprosium, and ytterbium are more preferred. These oxides are often used as an agent for absorbing light of specific wavelength and a phosphor.

Preferred are inorganic particles of aluminum oxide, cerium oxide, titanium oxide, zinc oxide, tin oxide, indium tin oxide, zirconium oxide, iron oxide, silicon oxide, or a mixture thereof.

The particle size of inorganic particles may be measured by a variety of methods. The range of particle size is described herein as a volume basis 50% cumulative distribution diameter ($D_{50}$) as measured by the dynamic light scattering method using laser light while the particle diameter may be observed by electron microscopy as supporting evidence. Although the value determined by such a measurement method does not depend on a particular measuring instrument, such an instrument as Nanotrac UPA-EX150 (Nikkiso Co., Ltd.) may be used for the dynamic light scattering method. For the electron microscopy, a transmission electron microscope H-9500 (Hitachi High-Technologies Corp.) may be used. When inorganic particles are added to a transparent silicone material, for example, the size $D_{50}$ of the inorganic particles should preferably be in a range of 1 to 200 nm, more preferably 1 to 100 nm, even more preferably 1 to 80 nm, and most preferably 1 to 50 nm, because transparency in the visible region is crucial. Particles with a size $D_{50}$ in excess of 200 nm, which is greater than the wavelength of the visible region, may cause noticeable scattering. Particles with a size $D_{50}$ of less than 1 nm may give an extremely large total surface area in the dispersing medium so that they are likely to agglomerate, and a dispersion thereof may be difficult to handle.

The core of the inorganic particles may be one or a complex of two or more selected from the foregoing metal oxides. Herein, the term "complex" is used in a broad sense and refers to a complex (double or multiple) oxide formed through simple mixing or chemical bonding. The complex oxide formed through chemical bonding refers to the form represented by the following formula (2).

$$(M^1O_x)_d(M^2O_y)_e \qquad (2)$$

Herein $M^1$ is an element selected from among Al, B, In, Si, Ge, Sn, Ti, Mn, Zn, Y, Zr, Hf, Ta, La, Ce, Pr, Nd, Tb, Dy, and Yb. $M^2$ is an element selected from among Al, B, In, Si, Ge, Sn, Ti, Mn, Zn, Y, Zr, Hf, Ta, La, Ce, Pr, Nd, Tb, Dy, and Yb, provided that the element of $M^2$ is not identical with the element of $M^1$. Letters x and y are given as x=a/2 wherein a is the valence number of $M^1$, and y=b/2 wherein b is the valence number of $M^2$. Letters d and e are real numbers meeting d+e=1, 0<d<1 and 0<e<1. That is, the structure has a unit in which $M^1$ bonds with $M^2$ via oxygen. In the structure, $M^1$ and $M^2$ may be sparsely distributed or locally concentrated. The structure wherein $M^1$ and $M^2$ are sparsely distributed is observed in a co-hydrolyzate of two or more metal alkoxides. The structure wherein $M^1$ and $M^2$ are locally concentrated is observed in core/shell type particles (i.e., particles each consisting of a core of microparticulate metal oxide and a shell of another metal oxide enclosing the core) and is formed, for example, by hydrolyzing a plurality of metal alkoxides in stages corresponding to the type of metal alkoxide.

The inorganic particles preferably contain at least one compound selected from among aluminum oxide, cerium oxide, titanium oxide, zinc oxide, indium tin oxide, zirconium oxide, tin oxide, iron oxide, and silicon oxide. In this case, the inorganic particles are preferably of core/shell structure having a core containing at least one compound selected from among aluminum oxide, cerium oxide, titanium oxide, zinc oxide, indium tin oxide, zirconium oxide, tin oxide, and iron oxide and a shell of silicon oxide around the core.

The inorganic particles may be of core/shell structure having a core of one or a complex of two or more selected from the foregoing metal elements or metal oxides and a shell of one or a complex of two or more selected from the foregoing metal oxides around the core. Typical of the core/shell type particles are core/shell type particles having a core of a complex oxide of titanium oxide-tin oxide (particulate titanium oxide having tin incorporated in solid solution) and a shell of silicon oxide around the core. Such core/shell type particles are prepared, for example, by the method described in JP 5704133.

The preferred inorganic particles are of core/shell structure having a core comprising at least one compound selected from among aluminum oxide, cerium oxide, titanium oxide, zinc oxide, indium tin oxide, zirconium oxide, tin oxide, and iron oxide and a shell of silicon oxide around the core.

Chain Length of Grafted Polysiloxane

The chain length of the grafted polysiloxane is preferably compared in terms of a ratio of an integrated value ($\Sigma D$) of $^{29}$Si-NMR signals assigned to all D units to an integrated value ($\Sigma M$) of $^{29}$Si-NMR signals assigned to all M units, i.e., $\Sigma D/\Sigma M$. D units are backbone constituents of the polysiloxane and M units are terminal constituents of the polysiloxane. It is presumed that a small value of $\Sigma D/\Sigma M$ indicates that the chain length of grafted polysiloxane is short whereas a large value of $\Sigma D/\Sigma M$ indicates that the chain length of grafted polysiloxane is long. The polysiloxane preferably has a $\Sigma D/\Sigma M$ value of at least 3, more preferably at least 5. A $\Sigma D/\Sigma M$ value of less than 3 is undesirable because the excluded volume of the grafted polysiloxane may be too small to avoid direct contact between particles, leading to agglomeration. The upper limit of $\Sigma D/\Sigma M$ is generally up to 1,000, preferably up to 500, though not critical.

Prior to measurement of a sample by $^{29}$Si-NMR spectroscopy, volatiles such as unreacted siloxanes and low molecular siloxanes are preferably distilled off from the sample. For many solid compounds, a phenomenon is known that when a solid compound is surface treated with linear polysiloxanes or alkyl chains having weak intermolecular interaction, the compound liquefies as a result of the interaction between compound molecules being reduced. Similarly, the inorganic particles used herein may liquefy as a result of grafting of polysiloxane. Ring-opening polymerization of cyclic siloxane often proceeds as equilibration reaction. When the inorganic particle-polysiloxane composite is obtained in liquid form, the liquid sample may contain some ungrafted polysiloxane component. However, as long as the equilibration reaction is used, there is a little or no chance of deviation of the $\Sigma D/\Sigma M$ value independent of whether or not the polysiloxane component which is not grafted to the particle surface is present. Accordingly, the $\Sigma D/\Sigma M$ value can be used for evaluation as an intrinsic value to the inorganic particle-polysiloxane composite.

As used herein, the "integrated value" refers to a quadrature problem associated with plotting of signal intensity relative to parts per million (ppm). For the quadrature, a threshold value is preferably set by an S/N ratio at a specific standard. The S/N ratio is at least 5, preferably at least 10, and more preferably at least 20. A S/N ratio of less than 5 may be unfavorable because the base line becomes thick and the accuracy of integration is worsened. The integrated value may be determined by the Simpson method using a computer, or by cutting a printed medium having a uniform plane density representative of spectrum to the spectral profile, and measuring its weight.

The $^{29}$Si-NMR spectroscopy may be applied to either solid or liquid. In the case of solid NMR spectroscopy, since a measurement sample must be evaporated to dryness as pre-treatment, the results do not necessarily reflect the bond states of silicon in the sample. Accordingly it is preferred to monitor by the NMR spectroscopy in liquid state. At this point, since $^{29}$Si nucleus has a negative gyromagnetic ratio ($\gamma_B$), the nuclear Overhauser effect (NOE) becomes inversed, suppressing the nuclear magnetic relaxation prevailing around resonance nucleus. Therefore, measurement conditions are preferably selected such that the negative NOE may not become significant. In the case of pulse Fourier-transform NMR, this problem can be solved using an adequate pulse sequence. For example, an off-resonance pulse sequence is preferably used. In the liquid $^{29}$Si-NMR spectroscopy, analysis is preferably made using a test tube and probe both made of silicon-free material. Exemplary of the silicon-free material which can be used in the NMR spectroscopy is polytetrafluoroethylene, typically Teflon®. In the liquid $^{29}$Si-NMR spectroscopy, an appropriate relaxation agent may be used for reducing the measurement time. As the relaxation agent, well-known reagents may be used (see, for example, Organometallics, Volume 27, Issue 4, pp 500-502 (2008), and the references therein). In particular, preference is given to chromium(III) acetylacetonate since it is fully soluble in organic solvents and does not cause agglomeration of titanium oxide. For example, when several droplets of a solution of chromium(III) acetylacetonate in deuterated chloroform (chloroform-$d_3$) in a concentration of about 1 mol/dm$^3$ are used as the relaxation agent, desirably both the relaxation effect and deuterium lock effect are available.

The notation of resonance magnetic field may be given by expressing in parts per million (ppm) a difference from the resonance magnetic field based on the resonance of $^{29}$Si nucleus of tetramethylsilane. According to this notation rule, most often D unit is detectable in the range of −10 to −30 ppm, preferably −15 to −25 ppm, M unit in the range of −5 to 15 ppm, preferably 0 to 10 ppm, and M unit having one alkoxy substituted in the range of −5 to −20 ppm, preferably −10 to −15 ppm. The negative value in the notation indicates that the resonance magnetic field has a difference on a higher magnetic field side than the reference line. The width of the reference line depends on the strength of the magnetic field of the NMR instrument used in measurement. The aforementioned preferred range of resonance line is the value obtained from an example where a magnetic field of 11.75 Tesla (T) is applied. The magnetic field which can be used in the NMR instrument is in a range of 5 T to 20 T, preferably 8 T to 15 T, and more preferably 10 T to 13 T. If the magnetic field is less than 5 T, measurement may be difficult because the S/N ratio becomes lower. If the magnetic field exceeds 20 T, measurement may be difficult because the resonance instrument becomes large sized. As a matter of course, the skilled artisan will analogize the strength of magnetic field, the width of resonance line, and the intensity of signals from the information set forth above.

The inorganic particle-polysiloxane composite preferably has the graft moiety attached to the core moiety via a siloxane bond. Attaching the graft moiety to the inorganic particle core moiety via a covalent bond is effective for endowing the composite with high environmental stability and dispersion stability. The siloxane bond between the core moiety and the graft moiety can be confirmed by $^{29}$Si-NMR spectroscopy.

It is preferred that the presence of a siloxane bond between the core moiety and the graft moiety is confirmed as a change of NMR signal assigned to D unit in measurement of $^{29}$Si-NMR spectroscopy. For example, NMR signals assigned to D' unit in which D unit is bonded to T unit of a polysiloxane and D" unit in which D unit is bonded to hydroxyl on the inorganic particle surface can be used for confirmation. NMR signal assigned to D' unit in which D unit is bonded to T unit of a polysiloxane is often detectable in the range of about −10 to about −25 ppm, preferably about −15 to about −20 ppm. The range of NMR signal assigned to D" unit in which D unit is bonded to hydroxyl on the inorganic particle surface varies with the type of inorganic particles bonded. In the case of silicon oxide, for example, the NMR signal assigned to D" unit bonded to the silicon oxide surface is often detectable in the range of about −10 to about −25 ppm, preferably about −15 to about −20 ppm.

The polysiloxane-grafted inorganic oxide is preferably in liquid form or solid form, more preferably in liquid form. Examples of the solid form include gel and powder. Examples of the liquid form include Newtonian fluid and Bingham fluid, preferably non-thixotropic Newtonian fluid.

Method for Preparing Inorganic Particle-Polysiloxane Composite

Although the method for preparing the inorganic particle-polysiloxane composite defined herein is not particularly limited, the method described below is preferable. The method for preparing the inorganic particle-polysiloxane composite is defined as comprising the steps of:

(a) providing a dispersion of inorganic particles in a polar organic solvent, the inorganic particles having a volume basis 50% cumulative particle size of 1 to 200 nm as measured by the dynamic light scattering method, and (b) mixing the dispersion with at least one cyclic siloxane having the general formula (3), and subjecting the cyclic siloxane in the mixture to ring-opening polymerization.

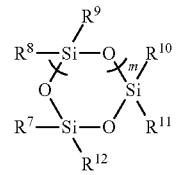

(3)

Herein $R^7$, $R^8$, $R^9$, $R^{10}$, $R^{11}$ and $R^{12}$ are each independently hydrogen or a group selected from the group consisting of a $C_1$-$C_{20}$ alkyl group, $C_2$-$C_{20}$ alkenyl group, $C_6$-$C_{20}$ aryl group, and (poly)dimethylsiloxy group of up to 50 silicon atoms, which may be substituted with a (meth)acrylic, oxiranyl or fluorine radical and n is an integer of 0 to 10.

Step (a)

Step (a) is to provide a dispersion of inorganic particles in a polar organic solvent, the inorganic particles having a volume basis 50% cumulative particle size of 1 to 200 nm as measured by the dynamic light scattering method.

As alluded to previously, the term "dispersion" refers to a stable dispersion state (i.e., colloidal dispersion) from which particles do not settle down over time, unless otherwise stated. The stable dispersion state may be achieved when the Brownian motion speed of particles is faster than the gravitational sedimentation velocity. Since particles in a viscous liquid such as silicone have a slow sedimentation velocity, it is difficult to judge whether or not the dispersion state is stable. In such a case, a centrifuge may be used to apply centrifugal force to promote particle precipitation, because it becomes quick to judge the presence or absence of precipitated particles.

The inorganic particles to be provided in step (a) are as defined above. The starting inorganic particles may be either synthesized products or commercially available products. Examples of commercially available products include IPA-ST-L (IPA dispersion of silica nanoparticles, Nissan Chemical Industries, Ltd.), IPA dispersion of alumina nanoparticles (Sigma-Aldrich), butyl acetate dispersion of zinc oxide (Sigma-Aldrich), IPA dispersion of indium tin oxide (Sigma-Aldrich), and ITRANB15WT %-G180 (alcohol dispersion of indium tin oxide, CIK NanoTech). Also included are Tainok M-6 (titania water dispersion, Taki Chemical Co., Ltd.), Needral P10 (ceria water dispersion, Taki Chemical Co., Ltd.), Nanouse CE-T20B (ceria water dispersion, Nissan Chemical Industries, Ltd.), Snowtex ST-20L (silica water dispersion, Nissan Chemical Industries, Ltd.), AS-100 (alumina water dispersion, Nissan Chemical Industries, Ltd.), Bayral AlML15 (alumina water dispersion, Taki Chemical Co., Ltd.), ALW10WT %-G0 (alumina water dispersion, CIK NanoTech), CEW10WT %-G120 (ceria water dispersion, CIK NanoTech), Cemeral S8 (tin oxide water dispersion, Taki Chemical Co., Ltd.), Bayral Fe—C10 (iron oxide water dispersion, Taki Chemical Co., Ltd.), zirconium oxide water dispersion (Sigma-Aldrich), ITRW15WT %-G30 (indium tin oxide water dispersion, CIK NanoTech), provided that water as the dispersing medium may be replaced by a polar organic solvent prior to use. Also, these water dispersions may be surface treated with conventional silane coupling agents or dispersants prior to solvent replacement.

Starting Colloidal Dispersion

Step (a) preferably uses a colloidal dispersion of inorganic oxide particles in water as a dispersing medium. Water may be fresh water such as tap water, industrial water, well water, natural water, rain water, distilled water, or deionized water, with deionized water being preferred. Deionized water may be produced by a pure water production unit, for example, FW-10 by Organo Corp. or Direct-QUV3 by Merck Millipore Corp. The dispersing medium may contain a water-miscible monohydric alcohol which is introduced during the step of preparing a water-dispersed colloidal solution to be described later. The water-miscible monohydric alcohol may also be contained as originating from the co-solvent used in the preparation of core/shell particles and hydrolytic by-products of sol-gel reaction on metal alkoxide.

The starting colloidal dispersion as provided in step (a) preferably has a dispersoid concentration of 1 to 35% by weight, more preferably 5 to 30% by weight, and even more preferably 10 to 25% by weight. A dispersoid concentration of less than 1 wt % is undesirable because of low production efficiency. A dispersoid concentration of more than 35 wt % is undesirable because gelation is likely to occur under certain conditions such as pH and temperature.

In the case of inorganic particles having a siloxane coating layer of $SiR^1O_{3/2}$ units on their surface, step (a) includes step (a-1) of surface treating inorganic particles with a silane compound and/or (partial) hydrolytic condensate thereof, and step (a-2) of replacing the solvent by a polar organic solvent. In the case of inorganic particles not having a siloxane coating layer of $SiR^1O_{3/2}$ units on their surface, step (a) is only step (a-2).

Step (a-1)

Step (a-1) is to add a silane compound having the general formula (I) and/or (partial) hydrolytic condensate thereof to inorganic particles for thereby modifying the particle surface.

Herein $R^{19}$ is each independently hydrogen or a group selected from among a $C_1$-$C_{20}$ alkyl group, $C_2$-$C_{20}$ alkenyl group, $C_6$-$C_{20}$ aryl group, and (poly)dimethylsiloxy group of up to 50 silicon atoms, which may be substituted with a (meth)acrylic, oxiranyl, amino, mercapto, isocyanate or fluorine radical. Y is a group selected from among alkoxy, acetoxy, enol and chlorine.

Suitable alkyl groups are $C_1$-$C_6$ alkyl groups, typically methyl and ethyl. Suitable aryl groups are $C_6$-$C_{10}$ aryl groups, typically phenyl. Suitable (poly)dimethylsiloxy groups are of 1 to 50 silicon atoms, especially 1 to 30 silicon atoms.

Exemplary of the silane compound having formula (I) are alkoxysilanes including hydrogentrimethoxysilane, hydrogentriethoxysilane, methyltrimethoxysilane, methyltriethoxysilane, methyltriisopropoxysilane, ethyltrimethoxysilane, ethyltriethoxysilane, ethyltriisopropoxysilane, propyltrimethoxysilane, propyltriethoxysilane, propyltriisopropoxysilane, phenyltrimethoxysilane, vinyltrimethoxysilane, allyltrimethoxysilane, γ-methacryloxypropyltrimethoxysilane, γ-methacryloxypropyltriethoxysilane, γ-acryloxypropyltrimethoxysilane, γ-glycidoxypropyltrimethoxysilane, γ-glycidoxypropyltriethoxysilane, β-(3,4-epoxycyclohexyl)ethyltrimethoxysilane, γ-chloropropyltrimethoxysilane, 3,3,3-trifluoropropyltrimethoxysilane, 3,3,3-trifluoropropyltriethoxysilane, perfluorooctylethyltrimethoxysilane, γ-mercaptopropyltrimethoxysilane, γ-aminopropyltrimethoxysilane, γ-aminopropyltriethoxysilane, N-(2-aminoethyl)aminopropyltrimethoxysilane, γ-isocyanatopropyltrimethoxysilane, γ-isocyanatopropyltriethoxysilane, phenyltrimethoxysilane, phenyltriethoxysilane, tris(3-trimethoxysilylpropyl)isocyanurate and tris(3-triethoxysilylpropyl)isocyanurate in which isocyanate groups are bonded together; and partial hydrolytic condensates of methyltrimethoxysilane, which are commercially available as KC-89S and X-40-9220 from Shin-Etsu Chemical Co., Ltd.; and partial hydrolytic condensates of methyltrimethoxysilane and γ-glycidoxypropyltrimethoxysilane, which are commercially available as X-41-1056 from Shin-Etsu Chemical Co., Ltd. Also included are allylsilanes such as triallylmethylsilane, triallylethylsilane, and triallylisopropylsilane; acetoxysilanes such as triacetoxymethylsilane, triacetoxyethylsilane, triacetoxypropylsilane, and triacetoxyphenylsilane; chlorosilanes such as trichloromethylsilane, trichloroethylsilane, trichloropropylsilane, and trichlorophenylsilane; and enol silanes such as triisopropenyloxymethylsilane, ethyltriisopropenyloxysilane, triisopropenyloxypropylsilane, and phenyltriisopropenyloxysilane.

Examples of the silane compound having formula (I) wherein $R^{19}$ is (poly)dimethylsiloxane include compounds having the general formula (II).

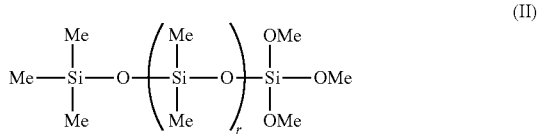

In formula (II), r is preferably an integer of 0 to 50, more preferably 5 to 40, and even more preferably 10 to 30. If r is more than 50, undesirably the compound may become stronger in silicone oil nature so that the solubility of surface treated organosol in various resins is restricted. The compound of formula (II) having an average structure wherein r=30 is commercially available as X-24-9822 from Shin-Etsu Chemical Co., Ltd.

The amount of the silane compound added is preferably 0.5 to 50 times, more preferably 1 to 25 times, and even more preferably 2 to 10 times the solids weight of the starting colloidal water dispersion. If the amount of the silane compound added is more than 50 times the solids weight of the starting colloidal water dispersion, then gelation may occur. If the amount of the silane compound added is less than 0.5 time the solids weight of the starting colloidal water dispersion, then agglomeration may occur due to short coverage.

The silane compound may be added by any techniques such as dropwise addition in liquid, dropwise addition out of liquid, and addition in portions, with the dropwise addition in liquid being preferred.

In step (a-1), an acid or base catalyst for promoting surface treatment may be added if desired. Suitable base catalysts include potassium hydroxide, sodium hydroxide, potassium carbonate, sodium carbonate, and basic ion exchange resins. Suitable acid catalysts include hydrochloric acid, sulfuric acid, methanesulfonic acid, trifluoromethanesulfonic acid, acetic acid, and cation exchange resins. Examples of the cation exchange resin include Amberlite® (Organo), Lewatit® (Lanxess), Purolite® (Purolite), and Muromac® (Muromachi Chemicals Inc.). The catalyst is preferably used in an amount of 0.01 to 20% by weight, more preferably 0.1 to 10% by weight, and even more preferably 1 to 5% by weight based on the weight of inorganic particles. If the amount of the catalyst is more than 20 wt %, undesirably rapid reaction takes place and is difficult to control. If the amount of the catalyst is less than 0.01 wt %, undesirably little reaction takes place.

When the silane compound is added, the colloidal water dispersion is preferably at a temperature of 0 to 45° C., more preferably 5 to 40° C., and even more preferably 10 to 35° C. At a temperature below 0° C., undesirably the dispersion can be altered via a state change by freezing. At a temperature above 45° C., undesirably the silane added may undergo unexpected hydrolytic condensation, and as a result of hydrolytic condensation, the reaction solution may elevate to a higher temperature below 70° C.

In step (a-1), the reaction solution may be diluted with an organic solvent, if desired. Suitable diluent solvents include monohydric alcohols such as methanol, ethanol, isopropyl alcohol and butanol; polyhydric alcohols such as ethylene glycol, propylene glycol and glycerol; ethers such as propylene glycol monomethyl ether, ethylene glycol monomethyl ether, glyme, and diglyme; ketones such as acetone and methyl isobutyl ketone; esters such as ethyl acetate and propylene glycol monomethyl ether acetate (PGMEA); and reactive esters such as hexanediol diacrylate, trimethylolpropane triacrylate, pentaerythritol tetraacrylate, and dipentaerythritol hexaacrylate. Inter alia, ethanol and isopropyl alcohol are preferred. Dilution is preferably carried out in order to avoid solvent shock in the subsequent step (a-2), but not essential. The dilution rate is preferably 1 to 20 times, more preferably 2 to 15 times, and even more preferably 3 to 10 times. A dilution rate of less than 1 may be too low to exert the intended solvent shock mitigating effect. If the dilution rate is more than 20 times, the subsequent step may take an unnecessary long treatment time.

Step (a-2)

Step (a-2) is to replace the dispersing medium of the reaction solution by a polar organic solvent. If necessary, the dispersion may be concentrated by ultrafiltration to exudate the dispersing medium. The dispersing medium may contain water contained in the water dispersion prepared in step (a-1), alcohols derived from the silicon compound added and/or hydrolytic condensate thereof and/or silicates formed by hydrolytic condensation, and organic solvents. By exudation of such complex system dispersion, the dispersion in the filtration chamber may be concentrated to a solids concentration of preferably 1 to 30% by weight, more preferably 5 to 25% by weight, and even more preferably 10 to 20% by weight. While the dispersing medium to be exudated herein is a complex mixture, a porous ceramic filter is advantageously used. Although the conventional technique recommends the use of hollow fiber membrane for the removal of salts from water, the hollow fiber membrane can be clogged on passage of fine particle dispersion. In the region covering removal of fine particles, concentration and solid-liquid separation, an organic polymer base ultrafiltration membrane is often used. However, if an organic solvent is contained, the filtration membrane will swell and become out of use. Therefore, for solid-liquid separation and concentration of an organic solvent-containing sample, an inorganic ceramic filter is effective.

For ultrafiltration, a filter including an inorganic ceramic membrane having an average pore size of preferably 5 nm to less than 20 nm, more preferably 6 nm to less than 18 nm, and most preferably 7 nm is used. The filter is preferably a rotatable disk. The inorganic ceramic membrane may be prepared by any well-known techniques. The materials of which the inorganic ceramic membrane is made include spinel, alumina, titania and zirconia base materials. For example, the spinel base material may be synthesized by the known technique (Ueno et al., Journal of Physics: Conference Series 2009, Vol. 165, No. 1, Fabrication of porous magnesium spinel with cylindrical pores by unidirectional solidification, or Zhang, Guo-Chang, et al., 2000, Vol. 2000, No. 03, MgAl$_2$O Ultrafiltration Ceramic Membrane Derived from Mg—Al Double Alkoxide). Preferably the pore size is controlled by adjusting synthesis conditions and the growth of spinel crystal. The filter is preferably formed by depositing a surface layer having a uniform pore size on a porous disk-shaped unglazed ceramic plate of alumina or the like, by epitaxial growth. The porous disk of alumina used herein is typically one having a pore size of 0.05 to 1 µm. The surface layer has an average pore size of preferably 5 nm to less than 20 nm, more preferably 6 nm to less than 18 nm, and most preferably 7 nm. With respect to the size of the disk-shape filter, its diameter is preferably 100 mm to less than 500 mm, more preferably 120 mm to less than 300 mm, and even more preferably 140 mm to 200 mm. If the diameter is less than 100 mm, undesirably little shear stress is applied upon rotation, and a certain surface area is not ensured. If the diameter exceeds 500 mm, then an extra torque may be required for rotation. Also a filter with too large a diameter is prone to breakage and difficult to handle. The thickness of the filter is preferably 1 mm to less than 10 mm, more preferably 3 mm to less than 5 mm. A filter with a thickness of less than 1 mm may lack mechanical strength whereas a filter with a thickness in excess of 10 mm may be unfavorable in providing the filtration chamber with a certain volume. The filter may be fabricated by the well-known technique, or commercially available filters may be used.

The pore size of the filter used in the solvent replacement step is preferably determined by electron microscopy. The electron microscope used to this end may be a scanning electron microscope, transmission electron microscope or atomic force microscope.

In the solvent replacement step, the dispersing medium is exudated under a static pressure of preferably less than 0.5 MPa, more preferably less than 0.4 MPa, even more preferably less than 0.3 MPa, and most preferably less than 0.2 MPa, and at least 0.03 MPa. If the static pressure is equal to or more than 0.5 MPa, the selection of interface for the ultrafiltration system may be restricted. A static pressure of less than 0.03 MPa may fail in efficient exudation. The static pressure is preferably achieved by hydraulic pressure or compression pneumatic pressure, using a hydraulic head tube whose surface is in contact with air or a closed system. Especially the compression pneumatic pressure system is preferred because the unit is compact. Compression air may be readily produced by any well-known techniques or commercially available compressors.

In the solvent replacement step, a shear stress of preferably 0.1 to 10 Pa, more preferably 0.5 to 5 Pa, and even more preferably 1 to 5 Pa is applied to the dispersion via the filter. The shear stress may be achieved by fluidization of the dispersion or by rotation of the disk-shaped filter. When the shear stress is achieved by rotation of the filter, desirably a high shear rate is available at the filter surface. The shear stress may be computed from the wall-to-wall distance in the filtration chamber and the rotational speed. If necessary, the filtration chamber may be equipped with an appropriate baffle. The baffle is preferably installed for the purpose of reducing the wall-to-wall distance in the filtration chamber. It is a well-known practice that the shear stress is increased by utilizing rotation and baffle. A maximum shear stress ($\tau$) acting on a circumference may be computed, for example, according to equation (1):

$$\tau = (\eta \cdot \pi \cdot \phi \cdot \omega)/L \text{ [Pa]} \qquad \text{equation (1)}$$

wherein ϕ is a diameter (m) of the disk-shaped filter, ω is a rotational speed (rps) of the filter, L is a wall-to-wall distance (m) between filter and filtration chamber, π is circle ratio, and η is a viscosity (Pa·s) of the dispersion. Assuming an example wherein diameter ϕ=0.15 m, filter rotational speed ω=16.7 rps (≈1,000 rpm), circle ratio π=3.14, dispersion viscosity η=0.001 Pa·s, and wall distance L=0.003 m, then τ=(0.001×3.14×0.15×16.7)/0.003≈2.6 Pa. The shear stress may be controlled to fall in the preferred range by changing parameters ϕ, ω and L.

The rotational energy applied to the dispersion in the solvent replacement step is preferably prescribed by the shear stress, but may also be prescribed by a fluid state. The fluid state may be prescribed by Reynolds number. The agitation Reynolds number is preferably 3,000 to 5,000,000, more preferably 5,000 to 1,000,000, and even more preferably 10,000 to 500,000. A Reynolds number of less than 3,000 indicates laminar flow agitation and hence, difficulty of efficient dispersion, whereas a Reynolds number of more than 5,000,000 may be unfavorable from the aspect of industrial efficiency because agitation requires an unnecessarily large amount of energy. It is noted that the Reynolds number (Re) may be determined from equation (2):

$$Re = \rho \cdot \omega \cdot \phi^2 / \eta \quad \text{equation (2)}$$

wherein ρ is a density (kg/m$^3$), ω is a rotational speed (rps), ϕ is a filter diameter (m) and η is a viscosity (Pa·s).

The inorganic particle dispersion used herein generally has a density ρ of 900 to 2,000 kg/m$^3$, preferably 1,000 to 1,500 kg/m$^3$, and a viscosity η of 0.001 to 0.05 Pa·s, preferably 0.002 to 0.01 Pa·s. For example, when a titanium oxide dispersion with ρ=1,000 kg/m$^3$ and η=0.001 Pa·s is treated by a disk-shaped filter having ϕ=0.15 m, at ω=16.7 rps, Re is computed to be ~3.8×10$^5$. Re can be adjusted to fall in the desired range by an appropriate choice of ω and ϕ. For agitation, the method of improving agitation efficiency using a reactor equipped with a baffle may be practiced.

The solvent replacement step is preferably performed at a temperature of 5 to 80° C., more preferably 10 to 60° C., even more preferably 15 to 50° C., and most preferably 20 to 40° C. Below 5° C., the dispersion may freeze. A temperature above 80° C. causes the dispersing medium to volatilize off, giving rise to a problem to the working environment, and/or provides reaction energy to a reactive ester, if used, causing gelation. In general, the viscosity of the dispersion depends on the temperature. Since the viscosity affects rotational torque, the solvent replacement step may be performed while adjusting the temperature so that any extra load may not be applied to an electromagnetic rotating machine and/or generator.

In the solvent replacement step, it is also possible to remove unreacted compounds and by-products by continuous ultrafiltration, if necessary.

Examples of the organic solvent include mono- and polyhydric alcohols such as methanol, ethanol, 1-propanol, 2-propanol, cyclopentanol, ethylene glycol, propylene glycol, β-thiodiglycol, butylene glycol and glycerol; ethers such as diethyl ether, dipropyl ether, cyclopentyl methyl ether, ethylene glycol dimethyl ether, diethylene glycol dimethyl ether, triethylene glycol dimethyl ether, ethylene glycol monomethyl ether, ethylene glycol monoethyl ether, ethylene glycol monopropyl ether, ethylene glycol monobutyl ether, propylene glycol monomethyl ether, propylene glycol monoethyl ether, propylene glycol monopropyl ether, propylene glycol monobutyl ether, butylene glycol monomethyl ether, butylene glycol monoethyl ether, butylene glycol monopropyl ether, and butylene glycol monobutyl ether; esters such as methyl formate, ethyl formate, propyl formate, butyl formate, methyl acetate, ethyl acetate, propyl acetate, butyl acetate, methyl propionate, ethyl propionate, propyl propionate, butyl propionate, methyl butyrate, ethyl butyrate, propyl butyrate, butyl butyrate, methyl benzoate, ethyl benzoate, propyl benzoate, butyl benzoate, dimethyl oxalate, diethyl oxalate, dipropyl oxalate, dibutyl oxalate, dimethyl malonate, diethyl malonate, dipropyl malonate, dibutyl malonate, ethylene glycol diformate, ethylene glycol diacetate, ethylene glycol dipropionate, ethylene glycol dibutyrate, propylene glycol diacetate, propylene glycol dipropionate, propylene glycol dibutyrate, ethylene glycol methyl ether acetate, propylene glycol methyl ether acetate, butylene glycol monomethyl ether acetate, ethylene glycol ethyl ether acetate, propylene glycol ethyl ether acetate, and butylene glycol monoethyl ether acetate; ketones such as acetone, diacetone alcohol, diethyl ketone, methyl ethyl ketone, methyl isobutyl ketone, methyl n-butyl ketone, dibutyl ketone, cyclopentanone, cyclohexanone, cycloheptanone, and cyclooctanone; amides such as dimethylformamide, dimethylacetamide, tetraacetylethylenediamide, tetraacetylhexamethylenetetramide, and N,N-dimethylhexamethylenediamine diacetate. Of these, methanol, ethanol, isopropyl alcohol and n-propyl alcohol are preferred for dispersion of inorganic particles and ease of distillation of the dispersing medium.

A volume of the organic solvent used in the solvent replacement step is preferably 1 to 20 times, more preferably 2 to 10 times, and even more preferably 3 to 8 times the volume of the filtration chamber. A less than 1 time volume may be insufficient for solvent replacement whereas a more than 20 time volume may be undesirable from the aspect of industrial efficiency.

In the case of inorganic particles not having a siloxane coating layer of SiR$^1$O$_{3/2}$ units on their surface, step (a-1) is unnecessary and only step (a-2) is performed. In this case, when inorganic particles are furnished as a dispersion in water, solvent replacement is performed as described above. When inorganic particles are furnished in powder form, they may be dispersed in the organic solvent. When inorganic particles are furnished as a dispersion in the organic solvent, step (a-2) is unnecessary.

Step (b)

Step (b) includes subjecting a cyclic siloxane in admixture with the inorganic particle dispersion resulting from step (a) to ring-opening polymerization.

In general, for the surface modification of particles with a graft polymer, there are known two methods, a method of substituting a previously molecular weight built-up polymer to the particle surface and a method of growing a polymer from the particle surface as a starting point. The former method is difficult to graft the polymer to the particle surface in a high density because the polymer reduces its reactivity at the end as its molecular weight increases. The latter method of growing a polymer from the particle surface as starting point in the co-presence of a low molecular weight siloxane having relatively high reactivity, as employed in the invention, is easy to modify the particle surface in a high density because once a monomer is grafted to the particle surface, it grows into a higher molecular weight form. In addition, since polymerization reaction takes place on the particle surface, the synthesis of a polymer before particle modification is unnecessary. Then, the latter method is superior in operation efficiency to the former method.

The inorganic particle dispersion provided in step (a) has a dispersoid concentration of preferably 1 to 30% by weight, more preferably 2 to 20% by weight, and even more preferably 5 to 10% by weight. A concentration of less than 1 wt % of the dispersoid may lead to low manufacture efficiency whereas a concentration of more than 30 wt % of the dispersoid may cause particles to agglomerate together in the complexing step.

Cyclic Siloxane

In the method for preparing the inorganic particle-polysiloxane composite, the cyclic siloxane subject to ring-opening polymerization is at least one cyclic siloxane having the general formula (3).

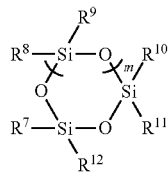

(3)

Herein $R^7$, $R^8$, $R^9$, $R^{10}$, $R^{11}$ and $R^{12}$ are each independently hydrogen or a group selected from the group consisting of a $C_1$-$C_{20}$ alkyl group, $C_2$-$C_{20}$ alkenyl group, $C_6$-$C_{20}$ aryl group, and (poly)dimethylsiloxy group of up to 50 silicon atoms, which may be substituted with a (meth)acrylic, oxiranyl or fluorine radical, and n is an integer of 0 to 10.

In formula (3), $R^7$ to $R^{12}$ are as exemplified above for $R^2$ to $R^6$. Examples of the cyclic siloxane include hexamethylcyclotrisiloxane, octamethylcyclotetrasiloxane, decamethylcyclopentasiloxane, dodecamethylcyclohexasiloxane, hexaphenylcyclotrisiloxane, octaphenylcyclotetrasiloxane, 2,4,6,8-tetramethylcyclotetrasiloxane, 1,3,5-tris(3,3,3-trifluoropropyl)-1,3,5-trimethylcyclotrisiloxane, 1,3,5-trimethyl-1,3,5-trivinylcyclotrisiloxane, and 2,4,6,8-tetramethyl-2,4,6,8-tetravinylcyclotetrasiloxane. Among others, preference is given to at least one siloxane selected from among hexamethylcyclotrisiloxane, octamethylcyclotetrasiloxane, decamethylcyclopentasiloxane, dodecamethylcyclohexasiloxane, and 2,4,6,8-tetramethylcyclotetrasiloxane.

The cyclic siloxane is added in an amount of preferably 10 to 1,000 parts by weight, more preferably 50 to 1,000 parts by weight, and even more preferably 100 to 500 parts by weight per 100 parts by weight of the inorganic particles. If the amount of cyclic siloxane is less than 10 parts by weight per 100 parts by weight of the inorganic particles, undesirably surface treatment may be insufficient, with possible agglomeration.

Ring-opening polymerization of the cyclic siloxane is carried out at a liquid temperature of preferably 25 to 150° C., more preferably 40 to 130° C., and even more preferably 60 to 100° C. At a liquid temperature below 25° C., ring-opening polymerization and grafting to inorganic particles may not take place sufficiently. A liquid temperature above 150° C. may cause the cyclic siloxane to evaporate off and disappear from within the reaction system.

An acid or base catalyst may be used for the purpose of promoting complexing reaction between inorganic particles and the polysiloxane. Suitable acid catalysts include acetic acid, hydrochloric acid, sulfuric acid, methanesulfonic acid, trifluoromethanesulfonic acid, and p-toluenesulfonic acid. Suitable base catalysts include sodium hydroxide, potassium hydroxide, sodium methoxide, sodium ethoxide, potassium methoxide, potassium ethoxide, and potassium siliconate.

An appropriate catalyst must be chosen from these compounds depending on the type of cyclic siloxane. For example, when a cyclic siloxane having a hydrosilyl group is the reactant, an acid catalyst is adequate. The amount of the catalyst added is preferably 10 to 0.01% by weight, more preferably 5 to 0.1% by weight based on the cyclic siloxane, but not limited thereto.

If added, the acid or base catalyst may be removed from the system by suitable means such as neutralization with base or acid, or adsorption by an inorganic oxide having an ion trapping ability.

In step (b), ring-opening polymerization of the cyclic siloxane may be carried out in the presence of a silane compound having the general formula (4):

$$R^{13}R^{14}Si(OR^{15})_2 \quad (4)$$

wherein $R^{13}$ and $R^{14}$ are each independently hydrogen or a group selected from the group consisting of a $C_1$-$C_{20}$ alkyl group, $C_2$-$C_{20}$ alkenyl group, $C_6$-$C_{20}$ aryl group, and (poly)dimethylsiloxy group of up to 50 silicon atoms, which may be substituted with a (meth)acrylic, oxiranyl or fluorine radical and $R^{15}$ is hydrogen or $C_1$-$C_6$ alkyl, and/or a hydrolytic condensate thereof as a polymer chain extending (D unit) component. Thereafter, the dispersing medium is distilled off, yielding the inorganic particle-polysiloxane composite. The amount of the silane compound having formula (4) added is preferably up to 1 mole equivalent, more preferably up to 0.5 mole equivalent, relative to the cyclic siloxane. More than 1 mole equivalent of the silane compound is undesirable because the progress of polymerization and hence grafting may be retarded. The co-presence of the polymer chain extending component enables to introduce a variety of functional groups onto the polysiloxane chain, which enable refraction control, improvement in compatibility with dispersing medium, viscosity control, or introduction of reactive side chain. It is noted that when the silane compound having formula (4) and/or hydrolytic condensate thereof is used, the amount of the silane compound added is preferably at least 0.01 mole equivalent, more preferably at least 0.05 mole equivalent, relative to the cyclic siloxane.

Examples of the silane compound having formula (4) include dimethyldimethoxysilane, dimethyldiethoxysilane, methylethyldimethoxysilane, diethyldimethoxysilane, diethyldiethoxysilane, methylpropyldimethoxysilane, methylpropyldiethoxysilane, diisopropyldimethoxysilane, phenylmethyldimethoxysilane, phenylmethyldiethoxysilane, diphenyldimethoxysilane, diphenyldimethoxysilane, vinylmethyldimethoxysilane, γ-glycidoxypropylmethyldimethoxysilane, γ-glycidoxypropylmethyldiethoxysilane, β-(3,4-epoxycyclohexyl)ethylmethyldimethoxysilane, γ-methacryloxypropylmethyldimethoxysilane, γ-methacryloxypropylmethyldiethoxysilane, γ-mercaptopropylmethyldimethoxysilane, γ-aminopropylmethyldiethoxysilane, N-(2-aminoethyl)aminopropylmethyldimethoxysilane.

In step (b), ring-opening polymerization of the cyclic siloxane may also be carried out in the presence of a silicon compound having the general formula (5) or (6):

$$R^{16}R^{17}R^{18}Si(X) \quad (5)$$

$$R^{16}R^{17}R^{18}SiOSiR^{16}R^{17}R^{18} \quad (6)$$

wherein $R^{16}$, $R^{17}$ and $R^{18}$ are each independently hydrogen or a group selected from the group consisting of a $C_1$-$C_{20}$ alkyl group, $C_2$-$C_{20}$ alkenyl group, $C_6$-$C_{20}$ aryl group, and (poly)dimethylsiloxy group of up to 50 silicon atoms, which may be substituted with a (meth)acrylic, oxiranyl or fluorine radical and X is a group selected from the group consisting of alkoxy, allyl, acetoxy, enol, and chlorine, as a polymer chain terminating (M unit) component. The amount of the silicon compound is up to 100 parts by weight per 100 parts by weight of the cyclic siloxane. Thereafter, the dispersing medium is distilled off, yielding the inorganic particle-polysiloxane complex. The co-presence of the polymer chain terminating component enables to introduce a variety of functional groups onto the polysiloxane chain at the end, which enable improvement in shelf stability, improvement in compatibility with dispersing medium, viscosity control, or introduction of reactive terminal.

The amount of the M unit component added is preferably up to 100 parts by weight, more preferably up to 50 parts by weight per 100 parts by weight of the cyclic siloxane. More than 100 parts by weight of the M unit component is undesirable because the growth of polysiloxane may be retarded and dispersibility may be insufficient. When the M unit component is added, the amount is preferably at least 0.01 part, more preferably at least 0.1 part by weight per 100 parts by weight of the cyclic siloxane.

Examples of the silane compound having formula (5) include alkoxysilanes such as trimethylmethoxysilane, trimethylethoxysilane, triethylmethoxysilane, n-propyldimethylmethoxysilane, n-propyldiethylmethoxysilane, isopropyldimethylmethoxysilane, isopropyldiethylmethoxysilane, propyldimethylethoxysilane, n-butyldimethylmethoxysilane, n-butyldimethylethoxysilane, n-hexyldimethylmethoxysilane, n-hexyldimethylethoxysilane, n-pentyldimethylmethoxysilane, n-pentyldimethylethoxysilane, n-hexyldimethylmethoxysilane, n-hexyldimethylethoxysilane, n-decyldimethylmethoxysilane, and n-decyldimethylethoxysilane; silanols such as trimethylsilanol, triethylsilanol, n-propyldimethylsilanol, n-propyldiethylsilanol, isopropyldimethylsilanol, isopropyldiethylsilanol, propyldimethylsilanol, n-butyldimethylsilanol, n-hexyldimethylsilanol, n-pentyldimethylsilanol, and n-decyldimethylsilanol; allylsilanes such as allyltrimethylsilane, allyltriethylsilane, and allyltriisopropylsilane; acetoxysilanes such as acetoxytrimethylsilane, acetoxytriethylsilane, acetoxytripropylsilane and acetoxytriphenylsilane; chlorosilanes such as chlorotrimethylsilane, chlorotriethylsilane, chlorotripropylsilane, and chlorotriphenylsilane; and enol silanes such as isopropenyloxytrimethylsilane, triethylisopropenyloxysilane, isopropenyloxytripropylsilane, and triphenylisopropenyloxysilane.

Examples of the siloxane compound having formula (6) include hexamethyldisiloxane, hexaethyldisiloxane, hexaphenyldisiloxane, 1,1,3,3-tetramethyldisiloxane, 1,3-diethynyl-1,1,3,3-tetramethyldisiloxane, 1,3-divinyl-1,1,3,3-tetramethyldisiloxane, 1,1,3,3-tetraphenyl-1,3-divinyldisiloxane, 1,3-bis(mercaptopropyl)tetramethyldisiloxane, 1,3-bis(aminopropyl)tetramethyldisiloxane, 1,3-bis(acetoxypropyl)tetramethyldisiloxane, and 1,3-bis(acryloyloxypropyl)tetramethyldisiloxane.

Step (c)

The method may further comprise the step (c) of removing the polar organic solvent as the dispersing medium from the dispersion of the inorganic particle-polysiloxane composite resulting from step (b). The removal of the dispersing medium may be carried out by suitable means such as distillation or solvent replacement via ultrafiltration. When the dispersing medium is removed by distillation, heating promotes a molecular weight buildup of polysiloxane parallel to the removal of the dispersing medium whereby the inorganic particle-polysiloxane composite coated with a higher molecular weight polysiloxane may be obtained.

The removal of the dispersing medium by distillation is preferably carried out under a pressure of 200 to 760 mmHg, more preferably 300 to 760 mmHg, and even more preferably 400 to 760 mmHg. Under a pressure of lower than 200 mmHg, undesirably the operation may be difficult to control because of bumping of the mixture. A pressure of higher than 760 mmHg may prevent the polar organic solvent from evaporating.

Distillation is preferably performed at a temperature of 50 to 250° C., more preferably 60 to 200° C., and even more preferably 80 to 150° C. A temperature below 50° C. is undesirable because distillation may take a time whereas at a temperature above 250° C., the organosol may be altered. The pressure is adjusted such that distillation may be performed at a temperature in the range.

The heat required for distillation may be provided by suitable heating means such as heat exchange with a heating medium, induction heating or microwave heating.

Step (d)

In the method, there may be included, after step (b) or (c), the step (d) of adding a cyclic siloxane of formula (3), a polymer chain extending component of formula (4) and/or a polymer chain terminating component of formula (5) or (6) and conducting reaction again. By adding step (d), even a compound which does not dissolve in the polar solvent prior to step (b) can be introduced into the polysiloxane graft moiety, which enable fine control of physical properties including refraction control, viscosity control, improvement in shelf stability, improvement in compatibility with dispersing medium, improvement in dispersion, and introduction of reactive terminal or reactive side chain.

Component D

Component (D) is a curing agent which is (D-1) an addition reaction curing agent or (D-2) an organic peroxide curing agent.

(D-1) Addition Reaction Curing Agent

The addition reaction curing agent (D-1) is a combination of an organohydrogenpolysiloxane with a hydrosilylation catalyst.

As long as the organohydrogenpolysiloxane has at least 2, preferably at least 3, more preferably 3 to about 200, and even more preferably 4 to about 100 silicon-bonded hydrogen atoms (i.e., SiH groups) per molecule, it may be of linear, cyclic, branched or three-dimensional network structure. Any of well-known organohydrogenpolysiloxanes used in addition reaction curable silicone rubber compositions may be used. The organohydrogenpolysiloxane preferably has the average compositional formula (7), for example.

$$R^{20}_p H_q SiO_{(4-p-q)/2} \quad (7)$$

Herein $R^{20}$ is each independently a substituted or unsubstituted, monovalent hydrocarbon group, preferably free of aliphatic unsaturation, typically of 1 to 12 carbon atoms, more typically 1 to 8 carbon atoms. Exemplary groups include alkyl groups such as methyl, ethyl and propyl, cycloalkyl groups such as cyclohexyl, aryl groups such as phenyl and tolyl, aralkyl groups such as benzyl, 2-phenylethyl and 2-phenylpropyl, and substituted forms of the foregoing in which some or all hydrogen atoms are substituted by halogen atoms, such as 3,3,3-trifluoropropyl. The subscripts p and q are positive numbers meeting the range: $0<p<3$, preferably $0.5 \leq p \leq 2.2$, and more preferably $1.0 \leq p \leq 2.0$; $0<q \leq 3$, preferably $0.002 \leq q \leq 1.1$, and more preferably $0.005 \leq q \leq 1$; and $0<p+q \leq 3$, preferably $1 \leq p+q \leq 3$, and more preferably $1.002 \leq p+q \leq 2.7$.

While the organohydrogenpolysiloxane has at least 2, preferably at least 3 SiH groups per molecule, the SiH groups may be located at the end or an intermediate position of the molecular chain or both. The organohydrogenpolysiloxane preferably has a viscosity of 0.5 to 10,000 mPa·s, more preferably 1 to 300 mPa·s at 25° C.

Examples of the organohydrogenpolysiloxane include 1,1,3,3-tetramethyldisiloxane, 1,3,5,7-tetramethylcyclotetrasiloxane, tris(hydrogendimethylsiloxy)methylsilane, tris(hydrogendimethylsiloxy)phenylsilane, methylhydrogencyclopolysiloxane, methylhydrogensiloxane/dimethylsiloxane cyclic copolymers, trimethylsiloxy-endcapped methylhydrogenpolysiloxane, trimethylsiloxy-endcapped dimethylsiloxane/methylhydrogensiloxane copolymers, dimethylhydrogensiloxy-endcapped dimethylpolysiloxane, dimethylhydrogensiloxy-endcapped dimethylsiloxane/methylhydrogensiloxane copolymers, trimethylsiloxy-endcapped methylhydrogensiloxane/diphenyl-siloxane copolymers, trimethylsiloxy-endcapped methylhydrogensiloxane/diphenyl-siloxane/dimethylsiloxane copolymers, trimethylsiloxy-endcapped methylhydrogensiloxane/methylphenylsiloxane/dimethylsiloxane copolymers, dimethylhydrogensiloxy-endcapped methylhydrogen-siloxane/dimethylsiloxane/diphenylsiloxane copolymers, dimethylhydrogensiloxy-endcapped methylhydrogen-siloxane/dimethylsiloxane/methylphenylsiloxane copolymers, copolymers consisting of $(CH_3)_2HSiO_{1/2}$ units, $(CH_3)_3SiO_{1/2}$ units and $SiO_{4/2}$ units,
copolymers consisting of $(CH_3)_2HSiO_{1/2}$ units and $SiO_{4/2}$ units,
copolymers consisting of $(CH_3)_2HSiO_{1/2}$ units, $SiO_{4/2}$ units and $(C_6H_5)_3SiO_{1/2}$ units, and
modified forms of the foregoing in which some or all methyl groups are substituted by other alkyl, phenyl or the like. It is noted that the term "endcapped" means that a siloxane is capped at both ends of the molecular chain with the referenced groups.

The organohydrogenpolysiloxane is preferably used in an amount of 0.1 to 40 parts by weight per 100 parts by weight of component (A). Differently stated, the organohydrogenpolysiloxane is preferably used in such an amount that 0.5 to 10, more preferably 0.7 to 5 silicon-bonded hydrogen atoms (≡SiH groups) may be available per aliphatic unsaturated bond (e.g., alkenyl and/or diene group) in component (A). On this basis, an amount of less than 0.5 SiH group may provide insufficient crosslinking or fail to achieve sufficient mechanical strength whereas an amount of more than 10 SiH groups may lead to degradation of cured physical properties, especially heat resistance and compression set.

The hydrosilylation catalyst is a catalyst which promotes hydrosilylation or addition reaction between alkenyl groups in component (A) and silicon-bonded hydrogen atoms (SiH groups) in the organohydrogenpolysiloxane. Typical of the hydrosilylation catalyst are platinum group metal catalysts which include platinum group metals alone and compounds thereof. Any of well-known catalysts for addition reaction curable silicone rubber compositions may be used. Examples include platinum catalysts such as particulate platinum metal on supports such as silica, alumina and silica gel, platinum chloride, chloroplatinic acid, alcohol solutions of chloroplatinic acid hexahydrate, palladium catalysts, and rhodium catalysts. Inter alia, platinum catalysts, typically platinum and platinum compounds are preferred.

The catalyst may be used in an amount capable of promoting addition reaction, which is typically 1 ppm to 1 wt %, more preferably 10 to 500 ppm of platinum group metal based on the weight of organopolysiloxane (A). Less than 1 ppm may be insufficient to promote addition reaction and lead to under-cure. More than 1 wt % may exert no extra effect to reaction and be uneconomical.

(D-2) Organic Peroxide Curing Agent

Examples of the organic peroxide curing agent (D-2) include benzoyl peroxide, 2,4-dichlorobenzoyl peroxide, p-methylbenzoyl peroxide, o-methylbenzoyl peroxide, 2,4-dicumyl peroxide, 2,5-dimethyl-2,5-bis(t-butylperoxy) hexane, di-t-butyl peroxide, t-butyl perbenzoate, and 1,6-hexane diol bis-t-butylperoxycarbonate.

The organic peroxide is preferably added in an amount of 0.1 to 10 parts, more preferably 0.2 to 5 parts by weight per 100 parts by weight of component (A). A less amount may lead to under-cure. If the amount is too large, the cured silicone rubber can be yellowed with decomposition residues of the organic peroxide.

It is noted that component (A) may be combined with amounts in the above-specified ranges of both components (D-1) and (D-2). In this case, the silicone rubber composition is of co-vulcanization type, that is, addition reaction cure and organic peroxide cure combined. The heat-curable silicone rubber composition may be any of commercially available ones.

Other Components

In the silicone rubber composition of the invention, various additive may be added if necessary and as long as the objects of the invention are not impaired. Suitable additives include fillers such as ground quartz, crystalline silica, diatomaceous earth, and calcium carbonate, colorants, tear strength improvers, acid acceptors, heat conductive agents such as alumina and boron nitride, parting agents, and dispersants for fillers such as alkoxysilanes, especially phenyl-containing alkoxysilanes and hydrolyzates thereof, diphenylsilane diol, carbon functional silanes, and silanol-containing low-molecular siloxanes. Likewise, any well-known fillers and additives for heat-curable silicone rubber compositions may be added.

The heat-curable silicone rubber composition may be prepared by mixing various components on a well-known mixer such as a kneader, Banbury mixer or two-roll mill. One typical procedure is by premixing the organopolysiloxane as component (A) with reinforcing silica as component (B), adding the polysiloxane-grafted inorganic particles as component (C) to the premix, and then adding the curing agent as component (D) thereto.

The silicone rubber composition thus prepared is then heat cured into a silicone rubber having improved transparency, UV-absorbing ability and heat resistance. The molding method may be selected from well-known molding methods in accordance with the shape and size of the desired molded article, for example, from casting, compression molding, injection molding, calendering, extrusion molding, coating, and screen printing. Curing conditions may be common conditions known to a particular molding method and generally include a temperature of 60 to 450° C., typically 80 to 400° C., and more typically 120 to 200° C. and a time of several seconds to about 1 day. This may be followed by post-cure (or secondary vulcanization) in an oven at 150 to 250° C., preferably 200 to 240° C. for at least 1 hour, preferably 1 to 70 hours, and more preferably 1 to 10 hours, for the purposes of reducing the compression set of the cured product, reducing low-molecular-weight siloxane fractions left in silicone rubber, or removing the decomposition product of organic peroxide.

The silicone rubber thus cured has high transparency. Specifically, a silicone rubber (or cured product) sheet of 2 mm thick has a transmittance of preferably at least 70%, more preferably at least 75%, and even more preferably at least 80% at wavelength 700 nm as measured by the method described later. Then the silicone rubber is suited as optical members for outdoor use.

EXAMPLE

Examples of the invention are given below by way of illustration and not by way of limitation. All parts are by weight. The DOP of a siloxane is a weight average DOP as measured versus polystyrene standards by GPC using toluene as developing solvent.

Measurement of Physical Properties

A test sheet was prepared according to JIS K6249 and measured for various physical properties including hardness (Durometer Type A), tensile strength and elongation at break according to JIS K6249. The results are shown in Table 1.

Measurement of Light Transmittance

Using a spectrophotometer model U-3310 (Hitachi, Ltd.), a silicone rubber sheet of 2 mm thick which had been post cured at 200° C. for 4 hours was measured for light transmittance. Values of light transmittance at wavelength 700 nm and 340 nm are shown in Table 2.

An inorganic particle-polysiloxane composite (i.e., polysiloxane-grafted inorganic particles) was prepared as follows.

Preparation of Core/Shell Particle Water Dispersion #1

An inorganic oxide water dispersion, that is, a dispersion of core/shell type particles having a core of titanium oxide-tin oxide complex oxide and a shell of silicon oxide as dispersoid in water as dispersing medium was prepared. Specifically, a dispersion of core/shell type particles was prepared by first furnishing a dispersion of titanium oxide-tin oxide particles serving as the core, and then effecting hydrolytic condensation of tetraethoxysilane.

Tin(IV) chloride pentahydrate (Wako Pure Chemical Industries, Ltd.), 1.8 g, was added to 66.0 g of 36 wt % titanium(IV) chloride aqueous solution (trade name TC-36 by Ishihara Sangyo Kaisha, Ltd.), thoroughly mixed, and diluted with 1,000 g of deionized water. 300 g of 5 wt % aqueous ammonia (Wako Pure Chemical Industries, Ltd.) was gradually added to the metal salt aqueous solution mixture to effect neutralization and hydrolysis, whereupon tin-containing titanium hydroxide precipitated. At this point, the titanium hydroxide slurry was at pH 8. The titanium hydroxide precipitate was deionized by repeating deionized water addition and decantation. To the tin-containing titanium hydroxide precipitate after deionization treatment, 100 g of 30 wt % aqueous hydrogen peroxide (Wako Pure Chemical Industries, Ltd.) was gradually added. Subsequent stirring at 60° C. for 3 hours allowed for thorough reaction. Thereafter, pure water was added for concentration adjustment, yielding a semitransparent solution of tin-containing peroxotitanic acid (solids concentration 1 wt %). A 500-mL volume autoclave (trade name TEM-D500 by Taiatsu Techno Corp.) was charged with 350 mL of the synthesized peroxotitanic acid solution, which was subjected to hydrothermal treatment under conditions: 200° C. and 1.5 MPa for 240 minutes. Thereafter, the reaction mixture in the autoclave was transferred through a sampling tube to a container kept in a water bath at 25° C. The reaction was quenched by this quick cooling, obtaining a complex oxide dispersion (i).

A separable flask equipped with a magnetic stirrer and thermometer was charged with 1,000 parts of the complex oxide dispersion (i), 100 parts of ethanol, and 2.0 parts of ammonia at room temperature (25° C.), followed by magnetic stirring. The separable flask was placed in an ice bath and cooled until the temperature of the contents reached 5° C. Tetraethoxysilane (trade name KBE-04 by Shin-Etsu Chemical Co., Ltd.), 18 parts, was added to the separable flask, which was mounted in μReactor EX (Shikoku Instrumentation Co., Inc.) where microwave was applied at a frequency 2.45 GHz and a power 1,000 W for 1 minute while magnetic stirring was continued. The thermometer was monitored during the microwave heating step, confirming that the temperature of the contents reached 85° C. The mixture was filtered through qualitative filter (Advantec 2B), obtaining a dilute colloidal dispersion. By ultrafiltration through a Dynafilter (trade name DyF152/S by Mitsubishi Kakoki Kaisha, Ltd., MgAl$_2$O disk (product number 2065181, type φ152/7 nm by ANDRITZ KMPT GmbH) having an average pore diameter of 7 nm), the dilute colloidal dispersion was concentrated to a solids concentration of 14 wt %, yielding a water dispersion #1 of core/shell type particles consisting of a core of titanium oxide-tin oxide complex oxide and a shell of silicon oxide.

Synthesis of Core/Shell Particle Ethanol Dispersion #1

A 2-L four-neck separable flask equipped with a Dimroth condenser, nitrogen gas inlet tube, thermometer, and stirring impeller was charged with 300 g (solids concentration 14 wt %) of Core/shell particle water dispersion #1 as metal oxide particle dispersion and 3 g of sulfonic acid type cation exchange resin as catalyst. To the flask, 225 g of methyltrimethoxysilane (KBM-13 by Shin-Etsu Chemical Co., Ltd.) was added and vigorously stirred at 250 rpm. It was observed that the dispersion reacted with methyltrimethoxysilane on stirring and became uniform and that the temperature of the dispersion rose from 25° C. to 52° C. The dispersion was heated and stirred at a temperature of 50° C. for 2 hours, after which it was diluted by adding 750 g of ethanol while stirring at 250 rpm. The diluted dispersion was introduced into an ultrafiltration apparatus Dynafilter (trade name DyF152/S by Mitsubishi Kakoki Kaisha, Ltd., MgAl$_2$O disk (product number 2065181, type φ152/7 nm by ANDRITZ KMPT GmbH) having an average pore diameter of 7 nm). With a static pressure of 0.2 MPa applied by compressed air, the rotating shaft coupled to the filter was rotated at 1,000 rpm. It was observed that the dispersion was exudated through the ceramic filter. In a receptor (volume 5,000 mL) connected to the filter at its outlet, 800 g of the exudate was collected. To the concentrated dispersion, an organic solvent (ethanol) was continuously supplied under a pressure of 0.2 MPa. With a static pressure of 0.2 MPa applied by compressed air, the rotating shaft coupled to the filter was rotated at 1,000 rpm. It was observed that the dispersion was exudated through the ceramic filter. With a receptor (volume 5,000 mL) connected to the filter at its outlet, supply of ethanol under pressure was continued until the exudate reached 800 g. The dispersion was taken out of the filtration chamber. There was obtained a core/shell particle ethanol dispersion #1 having a solids concentration of 17 wt %, a water concentration of 1.1 wt %, and a particle size of 3 nm. The particle size was a 50% cumulative particle size ($D_{50}$) in volume basis particle size distribution as measured by the dynamic light scattering method, specifically Nanotrac UPA-EX150 (Nikkiso Co., Ltd.). On thermogravimetric analysis (TGA) of a sample obtained by removing the dispersing medium from Core/shell particle ethanol dispersion #1 by vacuum distillation, the content of siloxane constituents in the overall particles was 9 wt %.

Synthesis of Polysiloxane-Grafted Inorganic Oxide #1

A 2-L four-neck separable flask equipped with a Dimroth condenser, nitrogen gas inlet tube, thermometer, and stirring impeller was charged with 258 g of Core/shell particle ethanol dispersion #1 having a solids concentration of 17 wt %, 634 g of ethanol, 179 g of octamethylcyclotetrasiloxane (D4) as cyclic siloxane, and 2 g of trifluoromethanesulfonic acid as catalyst. The contents were stirred at room temperature for 12 hours and refluxed for 2 hours to effect ring-opening polymerization. The ethanol was distilled off under atmospheric pressure, after which the reaction mixture was stirred at 110° C. for a further 2 hours. The mixture was cooled to room temperature, whereupon 300 g of toluene and 8 g of synthetic hydrotalcite (trade name Kyoward 500 by Kyowa Chemical Industry Co., Ltd.) were added thereto. The hydrotalcite having the acid catalyst adsorbed thereto was removed by filtration, after which the toluene was distilled off under vacuum, yielding a liquid polysiloxane-grafted inorganic oxide #1, i.e., inorganic oxide particle-polysiloxane composite having the polysiloxane grafted to the particle surface. On TGA, the content of siloxane constituents in the overall inorganic particle-polysiloxane composite was 72 wt %.

Synthesis of Polysiloxane-Grafted Inorganic Oxide #2

A liquid polysiloxane-grafted inorganic oxide #2 was prepared by the same procedure as in the synthesis of Polysiloxane-grafted inorganic oxide #1 in Example 1 except that 12 g of Core-shell particle ethanol dispersion #1, 28 g of ethanol, 18 g of D4, and 0.2 g of trifluoromethanesulfonic acid were used. On TGA, the content of siloxane constituents in the overall inorganic particle-polysiloxane composite was 88 wt %.

Synthesis of Cerium Oxide Ethanol Dispersion #1

A cerium oxide ethanol dispersion #1 was prepared by the same procedure as in the synthesis of Core/shell particle ethanol dispersion #1 in Example 1 except that a mixture of 150 g of a cerium oxide water dispersion (NanoUse CE-T20B by Nissan Chemical Industries, Ltd.) having a solids concentration of 20 wt % and 150 g of deionized water was used instead of Core/shell particle water dispersion #1. The cerium oxide ethanol dispersion #1 had a solids concentration of 15 wt %, a water concentration of 0.4 wt %, and a particle size of 3 nm. On TGA of a sample obtained by removing the dispersing medium from Cerium oxide ethanol dispersion #1 by vacuum distillation, the content of siloxane constituents in the overall particles was 8 wt %.

Synthesis of Polysiloxane-Grafted Cerium Oxide #1

A liquid polysiloxane-grafted cerium oxide #1 was prepared by the same procedure as in the synthesis of Polysiloxane-grafted inorganic oxide #1 in Example 1 except that 13 g of cerium oxide ethanol dispersion 1 having a solids concentration of 15 wt % was used instead of Core/shell particle ethanol dispersion #1, and 27 g of ethanol, 18 g of D4, and 0.18 g of trifluoromethanesulfonic acid were used. On TGA, the content of siloxane constituents in the overall inorganic particle-polysiloxane composite was 90 wt %.

The analytic results of the particles thus obtained are shown in Table 1.

Contents of Inorganic Particles and Polysiloxane Constituents

Contents of inorganic particles and polysiloxane constituents were determined by considering the weight of the residue after TGA as the weight of inorganic particles in the sample, and the weight loss as the weight of the polysiloxane constituents. TGA was performed by Thermo Plus system (Rigaku Corp.). Analysis was made in a nitrogen atmosphere over a temperature range of 25° C. to 900° C. using a platinum pan.

ΣD/ΣM Value

Deuterated chloroform was added to a sample so as to provide a 40 wt % sample solution. Several droplets of pre-prepared 1M solution of chromium(III) acetylacetonate in deuterated chloroform (both by Kanto Chemical Co., Ltd.) were added to the sample solution, which was transferred to a NMR tube of PTFE with a diameter 10 mm and analyzed by $^{29}$Si-NMR spectroscopy. Analytical conditions included gated decoupling, a pulse sequence of 45° pulses and pulse interval 6 seconds, a magnetic field strength 11.75 T, and a scan number of 2,220 times. From the analytical results, the integrated value (ΣD) of $^{29}$Si-NMR signals assigned to all D units and the integrated value (ΣM) of $^{29}$Si-NMR signals assigned to all M units were computed, and their ratio ΣD/ΣM was determined.

TABLE 1

|  | Polysiloxane-grafted inorganic oxide #1 | Polysiloxane-grafted inorganic oxide #2 | Polysiloxane-grafted cerium oxide |
|---|---|---|---|
| Siloxane constituent content (wt %) | 72 | 88 | 90 |
| Inorganic particle content (wt %) | 28 | 12 | 10 |
| ΣD/ΣM value | 7.3 | 7.1 | 29.0 |

Example 1

On a kneader, 100 parts of an organopolysiloxane gum consisting of 99.825 mol % dimethylsiloxane units, 0.15 mol % methylvinylsiloxane units and 0.025 mol % dimethylvinylsiloxy units and having an average DOP of ~6,000, 55 parts of fumed silica having a BET specific surface area of 200 m$^2$/g (Aerosil 200 by Nippon Aerosil Co., Ltd.), and 12 parts of a dimethylpolysiloxane containing silanol groups at both ends and having an average DOP of 15 and a viscosity of 30 mPa·s at 25° C. as a dispersant were added, milled, and heat treated at 170° C. for 2 hours, yielding a composition designated Base compound BC1.

On a two-roll mill, 100 parts of Base compound BC1, 1 part of Polysiloxane-grafted inorganic oxide #1, 0.4 part of 2,5-dimethyl-2,5-bis(t-butylperoxy)hexane as crosslinker were added, and uniformly milled into a gum-like silicone rubber composition. The composition was press cured at 165° C. and 70 kgf/cm$^2$ for 10 minutes to form a sheet of 2 mm thick, which was post cured in an oven at 200° C. for 4 hours. Subsequently, for the heat resistance test, the 2 mm thick sheet which had been post cured at 200° C. for 4 hours was further heated in an oven at 300° C. for 24 hours.

These silicone rubber sheets were kept at room temperature and measured for physical properties and light transmittance. The results are shown in Tables 2 and 3.

Example 2

A silicone rubber composition was prepared as in Example 1 aside from using 0.5 part of Polysiloxane-grafted inorganic oxide #1. Physical properties and light transmittance were similarly measured, with the results shown in Tables 2 and 3.

Example 3

A silicone rubber composition was prepared as in Example 1 aside from using Polysiloxane-grafted inorganic oxide #2 instead of Polysiloxane-grafted inorganic oxide #1. Physical properties and light transmittance were similarly measured, with the results shown in Tables 2 and 3.

Example 4

A silicone rubber composition was prepared as in Example 1 aside from using Polysiloxane-grafted cerium oxide #1 instead of Polysiloxane-grafted inorganic oxide #1. Physical properties and light transmittance were similarly measured, with the results shown in Tables 2 and 3.

Example 5

On a kneader, 100 parts of a linear dimethylpolysiloxane gum consisting of 99.825 mol % dimethylsiloxane units, 0.15 mol % methylvinylsiloxane units and 0.025 mol % dimethylvinylsiloxy units and having an average DOP of ~6,000, 30 parts of fumed silica having a BET specific surface area of 200 $m^2/g$ (Aerosil 200 by Nippon Aerosil Co., Ltd.), 2 parts of hexamethyldisilazane, and 0.5 part of water were added, milled, and heat treated at 170° C. for 2 hours, yielding a composition designated Base compound BC2.

On a two-roll mill, 100 parts of Base compound BC2, 1 part of Polysiloxane-grafted inorganic oxide #1, and an addition reaction curing agent, i.e., 0.5 part of C25A (platinum catalyst by Shin-Etsu Chemical Co., Ltd.) and 2.0 parts of C25B (organohydrogenpolysiloxane by Shin-Etsu Chemical Co., Ltd.) (SiH/SiVi=3.8) were added, and uniformly milled into a millable silicone rubber composition. The composition was press cured at 120° C. and 70 $kgf/cm^2$ for 10 minutes to form a sheet of 2 mm thick, which was post cured in an oven at 200° C. for 4 hours. Subsequently, for the heat resistance test, the 2 mm thick sheet which had been post cured at 200° C. for 4 hours was further heated in an oven at 300° C. for 24 hours.

These silicone rubber sheets were kept at room temperature and measured for physical properties and light transmittance. The results are shown in Tables 2 and 3.

Example 6

On a kneader, 100 parts of an organopolysiloxane gum consisting of 99.825 mol % dimethylsiloxane units, 0.15 mol % methylvinylsiloxane units and 0.025 mol % dimethylvinylsiloxy units and having an average DOP of ~6,000, 55 parts of fumed silica having a BET specific surface area of 200 $m^2/g$ (Aerosil 200 by Nippon Aerosil Co., Ltd.), 12 parts of a dimethylpolysiloxane containing silanol groups at both ends and having an average DOP of 15 and a viscosity of 30 mPa·s at 25° C. as a dispersant, and 2 parts of Polysiloxane-grafted inorganic oxide #1 were added, milled, and heat treated at 170° C. for 2 hours, yielding a composition designated Base compound BC3.

On a two-roll mill, 100 parts of Base compound BC3 and 0.4 part of 2,5-dimethyl-2,5-bis(t-butylperoxy)hexane as crosslinker were added, and uniformly milled into a gum-like silicone rubber composition. The composition was press cured at 165° C. and 70 $kgf/cm^2$ for 10 minutes to form a sheet of 2 mm thick, which was post cured in an oven at 200° C. for 4 hours. Subsequently, for the heat resistance test, the 2 mm thick sheet which had been post cured at 200° C. for 4 hours was further heated in an oven at 300° C. for 24 hours.

These silicone rubber sheets were kept at room temperature and measured for physical properties and light transmittance. The results are shown in Tables 2 and 3.

Comparative Example 1

A silicone rubber composition was prepared as in Example 1 aside from omitting Polysiloxane-grafted inorganic oxide #1. Physical properties and light transmittance were similarly measured, with the results shown in Tables 2 and 3.

Comparative Example 2

A silicone rubber composition was prepared as in Example 1 aside from using Titanium oxide water dispersion #1 instead of Polysiloxane-grafted inorganic oxide #1. Physical properties and light transmittance were similarly measured, with the results shown in Tables 2 and 3.

Comparative Example 3

A silicone rubber composition was prepared as in Example 1 aside from using Core/shell particle ethanol dispersion #1 instead of Polysiloxane-grafted inorganic oxide #1. Physical properties and light transmittance were similarly measured, with the results shown in Tables 2 and 3.

Comparative Example 4

A silicone rubber composition was prepared as in Example 1 aside from using a cerium oxide water dispersion (Nanouse CE-T20B, Nissan Chemical Industries, Ltd.) instead of Polysiloxane-grafted inorganic oxide #1. Physical properties and light transmittance were similarly measured, with the results shown in Tables 2 and 3.

Comparative Example 5

A silicone rubber composition was prepared as in Example 1 aside from using Cerium oxide ethanol dispersion #1 instead of Polysiloxane-grafted inorganic oxide #1. Physical properties and light transmittance were similarly measured, with the results shown in Tables 2 and 3.

TABLE 2

| | | After 200° C./4 hr post-cure | | | After 300° C./24 hr heating | | |
|---|---|---|---|---|---|---|---|
| | | Hardness Type A | Tensile strength (MPa) | Elongation at break (%) | Hardness Type A | Tensile strength (MPa) | Elongation at break (%) |
| Example | 1 | 69 | 9.8 | 420 | 72 | 5.2 | 200 |
| | 2 | 71 | 10.2 | 410 | 74 | 4.8 | 180 |
| | 3 | 70 | 10.5 | 420 | 73 | 4.9 | 180 |
| | 4 | 71 | 10.1 | 430 | 74 | 4.5 | 170 |
| | 5 | 71 | 11.5 | 460 | 75 | 4.2 | 160 |
| | 6 | 68 | 9.8 | 430 | 71 | 4.8 | 190 |

TABLE 2-continued

|  |  | After 200° C./4 hr post-cure | | | After 300° C./24 hr heating | | |
|---|---|---|---|---|---|---|---|
|  |  | Hardness Type A | Tensile strength (MPa) | Elongation at break (%) | Hardness Type A | Tensile strength (MPa) | Elongation at break (%) |
| Comparative | 1 | 70 | 10.5 | 420 | 88 | 0.1 | 5 |
| Example | 2 | 69 | 9.2 | 420 | 72 | 4.5 | 180 |
|  | 3 | 70 | 10.1 | 410 | 74 | 4.2 | 160 |
|  | 4 | 68 | 9.3 | 430 | 73 | 4.6 | 160 |
|  | 5 | 69 | 9.8 | 420 | 71 | 4.5 | 170 |

TABLE 3

|  |  | Light transmittance of 2-mm sheet (%) | |
|---|---|---|---|
|  |  | 700 nm | 340 nm |
| Example | 1 | 81 | 0 |
|  | 2 | 82 | 0 |
|  | 3 | 83 | 0 |
|  | 4 | 83 | 0 |
|  | 5 | 82 | 0 |
|  | 6 | 80 | 0 |
| Comparative | 1 | 82 | 37 |
| Example | 2 | 40 | 0 |
|  | 3 | 35 | 0 |
|  | 4 | 20 | 0 |
|  | 5 | 60 | 0 |

Japanese Patent Application No. 2015-239253 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A silicone rubber composition comprising:
   (A) 100 parts by weight of an organopolysiloxane containing at least two alkenyl groups per molecule and having the average compositional formula (1):

$$R_n SiO_{(4-n)/2} \quad (1)$$

wherein R is each independently a substituted or unsubstituted, monovalent hydrocarbon group and n is a positive number of 1.95 to 2.05,
   (B) 5 to 100 parts by weight of reinforcing silica having a specific surface area of at least 50 m²/g,
   (C) 0.001 to 10 parts by weight of an inorganic particle-polysiloxane composite comprising inorganic particles and a polysiloxane containing $SiR^2R^3O_{2/2}$ and $SiR^4R^5R^6O_{1/2}$ units grafted at least in part to surfaces of the particles, the inorganic particles having a 50% cumulative particle size of 1 to 200 nm in volume basis particle size distribution as measured by the dynamic light scattering method, and a total of siloxane constituents represented by $SiR^2R^3O_{2/2}$ and $SiR^4R^5R^6O_{1/2}$ units being 20 to 20,000 parts by weight per 100 parts by weight of the inorganic particles, wherein $R^2$, $R^3$, $R^4$ and $R^5$ are each independently hydrogen or a group selected from the group consisting of a $C_1$-$C_{20}$ alkyl group, $C_2$-$C_{20}$ alkenyl group, $C_6$-$C_{20}$ aryl group, and (poly)dimethylsiloxy group of up to 50 silicon atoms, which may be substituted with a (meth)acrylic, oxiranyl or fluorine radical, and $R^6$ is hydrogen or a group selected from the group consisting of a $C_1$-$C_{20}$ alkyl group, $C_2$-$C_{20}$ alkenyl group, $C_6$-$C_{20}$ aryl group, (poly)dimethylsiloxy group of up to 50 silicon atoms, $C_1$-$C_{10}$ alkoxy group, and hydroxyl group, which may be substituted with a (meth)acrylic, oxiranyl or fluorine radical, and
   (D) an effective amount of a curing agent.

2. The silicone rubber composition of claim 1 wherein the inorganic particles in component (C) comprise at least one compound selected from the group consisting of aluminum oxide, cerium oxide, titanium oxide, zinc oxide, indium tin oxide, zirconium oxide, tin oxide, iron oxide, and silicon oxide.

3. The silicone rubber composition of claim 1 wherein the inorganic particles in component (C) are of core/shell structure having a core comprising at least one compound selected from the group consisting of aluminum oxide, cerium oxide, titanium oxide, zinc oxide, indium tin oxide, zirconium oxide, tin oxide, and iron oxide and a shell of silicon oxide around the core.

4. The silicone rubber composition of claim 1 wherein the curing agent (D) is an organic peroxide.

5. The silicone rubber composition of claim 1 wherein the curing agent (D) is a combination of an organohydrogenpolysiloxane with a hydrosilylation catalyst, the composition being of addition reaction cure type.

6. A method for preparing a cured silicone rubber, comprising the step of heat curing the silicone rubber composition of claim 1.

7. The method of claim 6 wherein the heat curing step includes heat molding the silicone rubber composition at 80 to 400° C.

8. The method of claim 7 wherein the molding step is by extrusion molding, compression molding or injection molding.

9. The composition of claim 1, wherein from 0.02 to 10 mol % of all R groups in component (A) are unsaturated aliphatic groups.

10. The composition of claim 9, wherein the unsaturated aliphatic groups are vinyl groups and all R groups exclusive of the unsaturated aliphatic groups are methyl groups.

11. The composition of claim 1, wherein component (B) further comprises 3 to 20 parts by weight per 100 parts by weight of component (A) of a dispersant selected from the group consisting of silane compounds having a silanol group, silanol-containing organosiloxane oligomers, and mixtures thereof.

12. A cured silicone rubber comprising a silicone rubber composition comprising:
   (A) 100 parts by weight of an organopolysiloxane containing at least two alkenyl groups per molecule and having the average compositional formula (1):

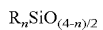

$$R_n SiO_{(4-n)/2} \quad (1)$$

wherein R is each independently a substituted or unsubstituted, monovalent hydrocarbon group and n is a positive number of 1.95 to 2.05, (B) 5 to 100 parts by weight of reinforcing silica having a specific surface area of at least 50 m²/g, (C) 0.001 to 10 parts by weight of an inorganic particle-polysiloxane composite comprising inorganic particles and a polysiloxane containing $SiR^2R^3O_{2/2}$ and $SiR^4R^5R^6O_{1/2}$ units grafted at least in part to surfaces of the particles, the inorganic particles having a 50% cumulative particle size of 1 to 200 nm in volume basis particle size distribution as measured by the dynamic light scattering method, and a total of siloxane constituents represented by $SiR^2R^3O_{2/2}$ and $SiR^4R^5R^6O_{1/2}$ units being 20 to 20,000 parts by weight per 100 parts by weight of the inorganic particles, wherein $R^2$, $R^3$, $R^4$ and $R^5$ are each independently hydrogen or a group selected from the group consisting of a $C_1$-$C_{20}$ alkyl group, $C_2$-$C_{20}$ alkenyl group, $C_6$-$C_{20}$ aryl group, and (poly)dimethylsiloxy group of up to 50 silicon atoms, which may be substituted with a (meth)acrylic, oxiranyl or fluorine radical, and $R^6$ is hydrogen or a group selected from the group consisting of a $C_1$-$C_{20}$ alkyl group, $C_2$-$C_{20}$ alkenyl group, $C_6$-$C_{20}$ aryl group, (poly)dimethylsiloxy group of up to 50 silicon atoms, $C_1$-$C_{10}$ alkoxy group, and hydroxyl group, which may be substituted with a (meth)acrylic, oxiranyl or fluorine radical, and (D) an effective amount of a curing agent in the cured state.

13. The cured silicone rubber of claim 12, having a light transmittance at wavelength 700 nm of at least 70% at a thickness of 2 mm.

14. A silicone rubber composition comprising:

(A) 100 parts by weight of an organopolysiloxane containing at least two alkenyl groups per molecule and having the average compositional formula (1):

$$R_nSiO_{(4-n)/2} \tag{1}$$

wherein R is each independently a substituted or unsubstituted, monovalent hydrocarbon group and n is a positive number of 1.95 to 2.05, (B) 5 to 100 parts by weight of reinforcing silica having a specific surface area of at least 50 m²/g, (C) 0.001 to 10 parts by weight of an inorganic particle-polysiloxane composite comprising inorganic particles and a polysiloxane containing $SiR^2R^3O_{2/2}$ and $SiR^4R^5R^6O_{1/2}$ units grafted at least in part to surfaces of the particles, the inorganic particles having a 50% cumulative particle size of 1 to 200 nm in volume basis particle size distribution as measured by the dynamic light scattering method, the polysiloxane being bonded to the inorganic particle surface via a siloxane coating layer containing $SiR^1O_{3/2}$ units, and a total of siloxane constituents represented by $SiR^1O_{3/2}$, $SiR^2R^3O_{2/2}$, and $SiR^4R^5R^6O_{1/2}$ units being 20 to 20,000 parts by weight per 100 parts by weight of the inorganic particles, wherein $R^1$ is independently hydrogen or a group selected from the group consisting of a $C_1$-$C_{20}$ alkyl group, $C_2$-$C_{20}$ alkenyl group, $C_6$-$C_{20}$ aryl group, and (poly)dimethylsiloxy group of up to 50 silicon atoms, which may be substituted with a (meth)acrylic, oxiranyl, amino, mercapto, isocyanate or fluorine radical, $R^2$, $R^3$, $R^4$ and $R^5$ are each independently hydrogen or a group selected from the group consisting of a $C_1$-$C_{20}$ alkyl group, $C_2$-$C_{20}$ alkenyl group, $C_6$-$C_{20}$ aryl group, and (poly)dimethylsiloxy group of up to 50 silicon atoms, which may be substituted with a (meth)acrylic, oxiranyl or fluorine radical, and $R^6$ is hydrogen or a group selected from the group consisting of a $C_1$-$C_{20}$ alkyl group, $C_2$-$C_{20}$ alkenyl group, $C_6$-$C_{20}$ aryl group, (poly)dimethylsiloxy group of up to 50 silicon atoms, $C_1$-$C_{10}$ alkoxy group, and hydroxyl group, which may be substituted with a (meth)acrylic, oxiranyl or fluorine radical, and (D) an effective amount of a curing agent.

15. The silicone rubber composition of claim 14, wherein the inorganic particles in component (C) comprise at least one compound selected from the group consisting of aluminum oxide, cerium oxide, titanium oxide, zinc oxide, indium tin oxide, zirconium oxide, tin oxide, iron oxide, and silicon oxide.

16. The silicone rubber composition of claim 14, wherein the inorganic particles in component (C) are of core/shell structure having a core comprising at least one compound selected from the group consisting of aluminum oxide, cerium oxide, titanium oxide, zinc oxide, indium tin oxide, zirconium oxide, tin oxide, and iron oxide and a shell of silicon oxide around the core.

17. The silicone rubber composition of claim 14, wherein the curing agent (D) is an organic peroxide.

18. A method for preparing a cured silicone rubber, comprising the step of heat curing the silicone rubber composition of claim 14.

19. The method of claim 18, wherein the heat curing step includes heat molding the silicone rubber composition at 80 to 400° C.

20. The method of claim 19, wherein the molding step is by extrusion molding, compression molding or injection molding.

21. The composition of claim 14, wherein from 0.02 to 10 mol % of all R groups in component (A) are unsaturated aliphatic groups.

22. The composition of claim 21, wherein the unsaturated aliphatic groups are vinyl groups and all R groups exclusive of the unsaturated aliphatic groups are methyl groups.

23. The composition of claim 14, wherein component (B) further comprises 3 to 20 parts by weight per 100 parts by weight of component (A) of a dispersant selected from the group consisting of silane compounds having a silanol group, silanol-containing organosiloxane oligomers, and mixtures thereof.

24. A cured silicone rubber comprising a silicone rubber composition comprising:

(A) 100 parts by weight of an organopolysiloxane containing at least two alkenyl groups per molecule and having the average compositional formula (1):

$$R_nSiO_{(4-n)/2} \tag{1}$$

wherein R is each independently a substituted or unsubstituted, monovalent hydrocarbon group and n is a positive number of 1.95 to 2.05, (B) 5 to 100 parts by weight of reinforcing silica having a specific surface area of at least 50 m²/g, (C) 0.001 to 10 parts by weight of an inorganic particle-polysiloxane composite comprising inorganic particles and a polysiloxane containing $SiR^2R^3O_{2/2}$ and $SiR^4R^5R^6O_{1/2}$ units grafted at least in part to surfaces of the particles, the inorganic particles having a 50% cumulative particle size of 1 to 200 nm in volume basis particle size distribution as measured by the dynamic light scattering method, the polysiloxane being bonded to the inorganic particle surface via a siloxane coating layer containing $SiR^1O_{3/2}$ units, and a total of siloxane constituents represented by $SiR^1O_{3/2}$, $SiR^2R^3O_{2/2}$, and $SiR^4R^5R^6O_{1/2}$ units being 20 to 20,000 parts by weight per 100 parts by weight of the inorganic particles, wherein $R^1$ is independently hydrogen or a group selected from the group consisting of a $C_1$-$C_{20}$ alkyl group, $C_2$-$C_{20}$ alkenyl group, $C_6$-$C_{20}$ aryl group, and (poly)dimethylsiloxy group of up to 50 silicon atoms, which may be substituted with a (meth)acrylic, oxiranyl, amino, mercapto, isocyanate or fluorine radical, $R^2$, $R^3$, $R^4$ and $R^5$ are each independently hydrogen or a group selected from the group consisting of a $C_1$-$C_{20}$ alkyl group, $C_2$-$C_{20}$ alkenyl group, $C_6$-$C_{20}$ aryl group, and (poly)dimethylsiloxy group of up to 50 silicon atoms, which may be substituted with a (meth)acrylic, oxiranyl or fluorine radical, and $R^6$ is hydrogen or a group selected from the group consisting of a $C_1$-$C_{20}$ alkyl group, $C_2$-$C_{20}$ alkenyl group, $C_6$-$C_{20}$ aryl group, (poly)dimethylsiloxy group of up to 50 silicon atoms, $C_1$-$C_{10}$ alkoxy group, and hydroxyl group, which may be substituted with a (meth)acrylic, oxiranyl or fluorine radical, and (D) an effective amount of a curing agent in the cured state.

25. The cured silicone rubber of claim 24, having a light transmittance at wavelength 700 nm of at least 70% at a thickness of 2 mm.

* * * * *